United States Patent
Bae et al.

(10) Patent No.: US 9,890,243 B2
(45) Date of Patent: Feb. 13, 2018

(54) POLYMERIC PLASTICIZER COMPOSITIONS

(71) Applicant: Resinate Materials Group, Inc., Plymouth, MI (US)

(72) Inventors: Woo-Sung Bae, Midland, MI (US); Rick Tabor, Plymouth, MI (US); Kevin Anthony Rogers, Farmington, MI (US); Shakti L. Mukerjee, Canton, MI (US)

(73) Assignee: Resinate Materials Group, Inc., Plymouth, MI (US)

( * ) Notice: Subject to any disclaimer, the term of this patent is extended or adjusted under 35 U.S.C. 154(b) by 0 days.

(21) Appl. No.: 15/400,420

(22) Filed: Jan. 6, 2017

(65) Prior Publication Data

US 2017/0121456 A1     May 4, 2017

Related U.S. Application Data

(60) Division of application No. 14/959,499, filed on Dec. 4, 2015, now Pat. No. 9,580,546, which is a continuation of application No. PCT/US2015/057685, filed on Oct. 28, 2015.

(60) Provisional application No. 62/072,074, filed on Oct. 29, 2014, provisional application No. 62/099,930, filed on Jan. 5, 2015.

(51) Int. Cl.
| | |
|---|---|
| *C08G 63/91* | (2006.01) |
| *C08J 3/18* | (2006.01) |
| *C08L 27/06* | (2006.01) |
| *C08L 67/02* | (2006.01) |
| *C08L 29/14* | (2006.01) |
| *C08L 67/08* | (2006.01) |

(52) U.S. Cl.
CPC ............. *C08G 63/916* (2013.01); *C08J 3/18* (2013.01); *C08L 27/06* (2013.01); *C08L 29/14* (2013.01); *C08L 67/02* (2013.01); *C08L 67/08* (2013.01); *C08J 2327/06* (2013.01); *C08J 2367/03* (2013.01); *C08J 2467/02* (2013.01); *C08L 2207/04* (2013.01)

(58) Field of Classification Search
CPC ....... C08G 63/916; C08J 3/18; C08J 2367/03; C08J 2327/06; C08J 2467/02; C08L 27/06; C08L 67/02; C08L 2207/04; C08L 29/14; C08L 67/08; C08K 5/11; C08K 5/0016; C08K 5/09
USPC ........................................................ 524/310
See application file for complete search history.

(56) References Cited

U.S. PATENT DOCUMENTS

| | | | |
|---|---|---|---|
| 4,197,353 A | 4/1980 | Tobias et al. | |
| 4,226,027 A | 10/1980 | Albus | |
| 4,468,483 A | 8/1984 | Yeakey et al. | |
| 4,520,139 A | 5/1985 | Crehan et al. | |
| 4,873,268 A | 10/1989 | Hallmark et al. | |
| 4,876,304 A | 10/1989 | Mertz et al. | |
| 5,068,395 A | 11/1991 | Bathe | |
| 5,147,926 A | 9/1992 | Meichsner et al. | |
| 5,206,341 A | 4/1993 | Ibay et al. | |
| 5,294,729 A | 3/1994 | Wicks et al. | |
| 5,319,128 A | 6/1994 | DuPont et al. | |
| 5,612,467 A | 3/1997 | Weuthen et al. | |
| 5,637,654 A | 6/1997 | Panandiker et al. | |
| 5,763,692 A | 6/1998 | Kierkus et al. | |
| 5,922,474 A | 7/1999 | Kuo | |
| 5,968,992 A | 10/1999 | Naber et al. | |
| 6,069,182 A | 5/2000 | Naber et al. | |
| 6,750,260 B2 | 6/2004 | Sendijarevic | |
| 7,030,057 B2 | 4/2006 | Matsumoto | |
| 7,659,320 B2 | 2/2010 | Berard | |
| 7,902,264 B2 | 3/2011 | Determan et al. | |
| 8,344,172 B2 | 1/2013 | Tabor et al. | |
| 8,546,519 B2 | 10/2013 | Selifonov | |
| 8,604,077 B2 | 12/2013 | Wicks et al. | |
| 8,680,227 B1 | 3/2014 | Bell et al. | |
| 8,692,013 B2 | 4/2014 | Tabor et al. | |
| 2004/0102533 A1 | 5/2004 | Durand et al. | |
| 2006/0004172 A1 | 1/2006 | Nefzger et al. | |
| 2006/0025544 A1 | 2/2006 | Koube et al. | |

(Continued)

FOREIGN PATENT DOCUMENTS

| | | |
|---|---|---|
| CA | 2216772 | 4/1998 |
| CN | 102516593 | 6/2012 |

(Continued)

OTHER PUBLICATIONS

Wang et al. "A high-capacity carbon prepared from renewable chicken feather biopolymer for supercapacitors" Journ. Power Sources (2013) vol. 225, pp. 101-107.

(Continued)

*Primary Examiner* — Angela C Scott
(74) *Attorney, Agent, or Firm* — Dilworth IP LLC

(57) ABSTRACT

The present invention relates to polymeric plasticizer compositions made from an aromatic acid source, a glycol, and a $C_4$-$C_{36}$ monocarboxylic acid, or ester or anhydride thereof. The aromatic acid source can include polymeric materials such as recycled polyethylene terephthalate (PET). The present invention also relates to methods for making the polymeric plasticizer compositions, to methods of plasticizing polymeric materials, and to plasticized polymeric compositions. The polymeric plasticizers are useful for plasticizing various polymers, such as thermoplastic polymers, including, for example, polyvinyl chloride (PVC). The polymeric plasticizers provide a sustainable alternative to conventional phthalate ester plasticizers, such as diisooctyl phthalate (DOP).

31 Claims, No Drawings

(56) References Cited

U.S. PATENT DOCUMENTS

| | | |
|---|---|---|
| 2006/0089453 A1 | 4/2006 | Pajerski |
| 2007/0225473 A1 | 9/2007 | Determan et al. |
| 2008/0194713 A1 | 8/2008 | Kim et al. |
| 2009/0131625 A1 | 5/2009 | Kurian et al. |
| 2009/0234034 A1 | 9/2009 | Blanco |
| 2010/0204392 A1 | 8/2010 | Marsh et al. |
| 2011/0039959 A1 | 2/2011 | Kim et al. |
| 2012/0035376 A1 | 2/2012 | Mullen et al. |
| 2012/0118201 A1 | 5/2012 | Mullen et al. |
| 2012/0121911 A1 | 5/2012 | Mullen et al. |
| 2012/0214920 A1 | 8/2012 | Frenkel |
| 2013/0072628 A1 | 3/2013 | Crawford et al. |
| 2014/0060383 A1 | 3/2014 | Wu et al. |
| 2014/0163127 A1 | 6/2014 | Selifonov et al. |

FOREIGN PATENT DOCUMENTS

| | | |
|---|---|---|
| CN | 103030796 | 4/2013 |
| CN | 102061009 | 10/2013 |
| EP | 1693409 | 8/2006 |
| EP | 2565226 | 3/2013 |
| ES | 2277554 | 7/2008 |
| JP | 04189881 | 7/1992 |
| JP | 1995292223 | 11/1995 |
| JP | 2000198876 | 7/2000 |
| JP | 2004161666 | 6/2004 |
| JP | 2004168811 | 6/2004 |
| JP | 2004168812 | 6/2004 |
| JP | 2004238581 | 8/2004 |
| JP | 200500216 | 1/2005 |
| PL | 212329 | 9/2012 |
| WO | 2004005365 | 1/2004 |
| WO | 2007062118 | 5/2007 |
| WO | 2008085397 | 7/2008 |
| WO | 2009032905 | 3/2009 |
| WO | 2009048874 | 4/2009 |
| WO | 2009049041 | 4/2009 |
| WO | 2010075330 | 7/2010 |
| WO | 2010151558 | 12/2010 |
| WO | 2011057018 | 5/2011 |
| WO | 2011129940 | 10/2011 |
| WO | 2011138432 | 11/2011 |
| WO | 2012065116 | 5/2012 |
| WO | 2013154874 | 10/2013 |
| WO | 2014023684 | 2/2014 |
| WO | 2014027104 | 2/2014 |
| WO | 2014075051 | 5/2014 |

OTHER PUBLICATIONS

Flores-Hernandez et al. "All green composites from fully renewable biopolymers: Chitosan-starch reinforced with keratin from feathers" Polymers (2014), vol. 6, No. 3 pp. 686-705.
Lardjane et al. "Migration of Additives in Simulated Landfills and Soil Burial Degradation of Plasticized PVC", Journal of Applied Polymer Science, vol. 111:1 (2009) pp. 525-531.
Lindstrom et al. Migration Resistant Polymeric Plasticizer for Poly(vinyl chloride); Journal of Applied Polymer Science, vol. 104: 4, (2007) pp. 2458-2467.
Ziska et al. "Miscibility in PVC-polyester blends", Polymer, vol. 22 No. 7 (1981), pp. 918-923.
Prud'homme, "Miscibility Phenomena in Polyester/Chlorinated Polymer Blends", Polymer Eng. and Sci. vol. 22, No. 2, (1982), pp. 90-95.
Cherian et al. "Novel CO2-based Polycarbonate Polyols for High Performance Polyurethane Hot Melt Adhesives" ACC (2014) 16 pages.
Yin et al. "Oligomeric Isosorbide Esters as Alternative Renewable Resource Plasticizers for PVC", Journal of Applied Polymer Science, (2011) vol. 119, No. 4, pp. 2400-2407.
Krauskopf "How About Alternatives to Phthalate Plasticizers?" Journal of Vinyl & Additive Technology, Dec. 2003, vol. 9, No. 4, pp. 159-171.

Carty et al. "Flammability of acrylonitrile-butadiene-styrene/poly9vinyl chlroide) blends; limiteing oxygen index data" Polymer, vo. 35, No. 25 (1994), pp. 5595-5596.
Langanke et al. "Carbon dioxide (CO2) as sustainable feedstock for polyurethane production" Green Chemistry, (2014) 15, pp. 1865-1870.
Technical Guide: ETERNACOLL (R) PH; "High Performance for your polyurethanes" UBE Industries, 7 pages, Date Unknown.
Weber "Polymer Blends: Materials with versatile Properties" Macromol. Symp. (2001), 163 pp. 235-250.
Weber "Engineering Polymer Alloys by Reactive Extrusion", Macromol. Symp. 181, (2002) 189-200.
Collias et al. "Biobased Terephthalic Acid Technologies: A Literature Review"; Industrial Biotechnology vol. 10, No. 2 (2014) pp. 91-105.
Kelsey et al. "CycloShield (TM) Copolyesters: Greener, BPA-Free Alternative to Polycarbonate" Polymeric Materials: Science & Engineering (2010) 102, pp. 795-796.
Product Datasheet: DESMOPHEN (R) C 1100; Bayer MaterialScience LLC, Jul. 2, 2014, 2 pages.
Product Datasheet: DESMOPHEN (R) C 1200; Bayer MaterialScience LLC, Jul. 2, 2014, 2 pages.
Gezderi et al. "Recycling of Waste PET: Usage as Secondary Plasticizer for PVC"; Polymer-Plastics Technology and Engineering, 44 (2005) pp. 1379-1388.
Technical Publication: "The Function and Selection of Ester Plasticizers", Hallstar, 26 pages, date Unknown.
David et al. "Summary of Mammalian Toxicology and Health Effects of Phthalate Esters", Handbook of Environmental Chemistry, vol. 3, part Q (2003) 299-316.
Xanthos et al., "Transcreations in Condensation Polymers: Ch. 10: Effects of Transreactions on the Compatibility and Miscibility of Blends of Condensation Polymers" (1999), 411-427.
Jofre-Reche et al. "Novel Polyurethane Coatings Obtained with Polycarbonate Diol for Pipelines with Improved Mechanical Properties and Hydrolysis Resistance" ACC (2014) 10 pages.
Choi et al. "Unentangled Star-Shape (poly)e-caprolactones)s as phthalate-Free PVC Plasticizers Designed for Non-Toxicity and Improved Migratrion Resistance", Applied Materials & Interfaces, 1117-1127, Date Unknown.
Lutz, Jr. "Polymeric Plasticizers", pp. 223-252, Date Unknown.
Dutt et al. "Synthesis and characterization of polymeric plasticizers from PET waste and its applications in nitrile rubber and nitrile-PVC blend", Iran Polym J (2013) 22:481-491.
Cadogan "Health and envrionmental effects of phthalate plasticisers for poly-vinyl) chloride)—an update" Plastics, Rubber and Composites, 1999, vol. 28, No. 10, 476-481.
Krauskopf et al. "Plasticizers", chapter 5, 173-199, Date Unknown.
Kilinc et al. "Recycling of Waste PET: Usage as Secondary Plasticizer for PVC", Polymer-Plastics Tech. and Eng., 44: (2005) 1379-1388.
Thacker et al. "Antidegradants", Handbook of Vinyl Formulating, 2008, pp. 77-78.
You et al.,"Chemical Recycling of Polyurethanes and Applications for the Recyclates", BASF Corporation, pp. 363-374, date Unknown.
International Search Report and Written Opinion mailed in PCT/US2015/057685 dated Jan. 29, 2016.
You et al., A New Era of Polyurethane Recycling—Fascia to Roof Rail: Sustainable Recycling in Automotive, Polyurethanes Expo (1999), pp. 377-382.
von Stein et al., "Salt-assisted Organic-acid-catalyzed depolymerization of cellulose", Green Chem. (2010) 12, 1844-1849.
Viana et al. "Chemical Recycling of PET by Catalyzed Glycolysis: Kinetics of the Heterogeneous Reaction", Chem. Eng. Journ. 173 (2011) 210-219.
Saucedo-Rivalcoba et al., "(Chicken feathers keratin)/polyerathane membranes", Appl. Phys. A (2011) 104:219-228.
Pierson et al., "Acid-Catalyzed Chitin Liquefaction in Ethylene Glycol", ACS Publications (2014) 2081-2089.
Shukla et al., "Zein, the Industrial Protein from Corn", Industrial Crops and Products 13 (2001) 171-192.

(56) References Cited

OTHER PUBLICATIONS

Kelsey et al. "High Impact, Amorphous Terephthalate Copolyesters of Rigid 2,2,4,4-Tetramethyl-1,3-cyclobutanediol with Flexible Diols", Macromolecules (2000), 33, 5810-5818.
Sun, "Enzymatic Hydrolysis of Soy Proteins and the Hydrolysates Utilisation", Int. Journ. of Food Science and Technology (2011), 46, 2447-2459.
Ullah et al., "Bioplastics from Father Quill", BioMacromolecules, ACS (2011), 3826-3832.
Frisch, "Progress in Recycling of Polyurethanes", Polimery (1998) 43, No. 10, 579-660.
Bouchard, et al. "Characterization of Depolymerized Cellulosic Residues", Wood Sci. Technol. (1990) 24: 159-169.
Lee et al., "Desaminated Glycolysis of Water-Blown Rigid Polyurethane Foams", Journal of Applied Polymer Science, vol. 77, (2000) 2646-2656.
"Fuel from Chicken Feathers?", www.alternative-energy-newsinfofuel-from-chicken-feathers.pdf, Dec. 3, 2015.
Buggy et al. "Recovery of Polyol from Flexible Polyurethane Foam Wastes", Key Engineering Materials vols. 99-100 (1995) pp. 65-78.
Nagase et al., "Development of a Chemical Recycling Process for Waste Plastics Using Supercritical Water", Kobelco Technology Review No. 22, (Apr. 1999) 11-14.
Nikles et al., "New Motivation for the Depolymerization Products Derived from Poly(Ethylene Terephthalate) (PET) Waste: a Review", Macromol. Mater. Eng., (2005) 290, 13-30.
Sigma Product Information Sheet, "Zein from Maize", MWM/RXR, Oct. 2003.
Bartecka, et al., "Polyols Obtained from Chemical Recycling of Integral Polyurethanes Waste Used for the Production of Urethane-rubber Composites", Modern Polymeric Materials for Environmental Applications, vol. 3, (2008), pp. 5-8.
Zahedi et al. "Optimization of Phthalic/Maleic Anhydride-Endcapped PET Oligomers using Response Surface Method", Polymer Engineering and Science (2014), 419-429.
Mazurek et al. "PET Wastes utilization in the synthesis of aliphatic-aromatic polyurethane elastomers", Polym. Adv. Technol., (2014) 25, 1273-1284.
Kim et al., "Kinetics of Polycarbonate Glycolysis in Ethylene Glycol", Ind. Eng. Chem. Res. (2009), 48, 685-691.
Oku et al., "Chemical conversion of poly(carbonate) to bis(hydroxyethyl) ether of bisphenol A. An Approach to the chemical recycling of plastic wastes as monomers", Polymer 41 (2000) 6749-6753.
Wicks, Jr., et al., "Powder Coatings", Organic Coatings: Science and Technology, Third Ed., (2007) 548-571.
Tavano, "Protein hydrolysis using proteases: An important tool for food biotechnology", Journal of Molecular Catalysis B: Enzymatic 90 (2013) 1-11.
Datta, "Effect of glycols used as glycolysis agents on chemical structure and thermal stability of the produced glycolsyates", J. Therm. Anal. Calorim (2012) 109:517-520.
Chun et al. "Characterization and Improvement of the Recyclate Obtained from the Glycolysis Reaction of Waste MDI Based Polyurethane Foam", Polyurethane Con. Oct. 8-11, 2000, (2000) 537-541.
Nikje et al. "Polyurethane Waste Reducation and Recycling: From Bench to Pilot Scales", Designed Monomers and Polymers 14:5 (2011) 395-421.
Sendijarevic et al., "Chemical Recycling of Mixed Polyurethane Foam Stream Recovered from Shredder Residue into Polyurethane Polyols", Journal of Cellular Plastics, vol. 43 (Jan. 2007) 30-46.
Molero et al., "Chemical recovery of flexible polyurethane foam wastes", WIT Transactions on Ecology and the Environment, vol. 140, (2010) pp. 69-81.
Molero et al., "Influence of the Use of Recycled Polyols Obtained by Glycolsysis on the Preparation and Physical Properties of Flexible Polyurethane", Journal of Applied Polymer Science, vol. 109 (2008) pp. 617-626.
Ulrich, "Recent Advances in Polyisocyanurate Technology", Int. Conf. (1980): Cellular and non-Cellular Polyurethanes; pp. 81-89.
Ritter, "BPA is Indispensible for Making Plastics" ACS—Chem. Eng. vol. 89, No. 23, (2011).
Leaversuch, "Thermoplastic Polyesters; It's a Good Time to Know Them Better", Plastics Technology, (Jun. 2004), pp. 46-51, 63-64.
European Commission Joint Research Centre "Survey of technologies for the recycling by chemolysis", (May 1996), IPTS, pp. 1-41.
Saint-Loup et al. "Synthesis of (polyethylene terephthalatefpolyecaprolactone) copolyesters", Polymer 44, (2003) 3437-3449.
Mulder, "Proteins in Biomass Streams" Biorenewable Resources Platform, (Apr. 2010), 60 pages.
Schmid et al. "Thermoforming of whey protein-based barrier layers for application in food packaging", FS&T, vol. 25, Issue 3, (2011) pp. 34-35.
Floris et al., "Application of whey proteins as coating ingredients", NUTRAfoods (2010), 9(4) pp. 25-31.
Burkhart, "Silicone Surfactants, Unique Additives to Optimize Polyurethane Foam Manufacturing", 60 Years of Polyurethanes, International Symposium and Exhibition (1998) p. 375.
Boehme et al, "Synthesis and characterization of a novel unsaturated polyester based on poly(trimethylene)", Polymer (2006), 47(6), 1892-1898 CODEN: POLMAG; ISSN: 0032-3861.
Raudenbusch, "A novel concept for crosslinking surface coatings", Organic Coatings (1984), 7, 59-78 CODEN: ORGCD8; ISSN: 0883-2676 (abstract).
Ronda et al. "A renewable approach to thermosetting resins" Reactive & Functional Polymers (2013), 73(2), 381-395 CODEN: RFPOF6; ISSN: 1381-5148.
Zhang et al. "Study of liquefaction of wood and its components in polyhydric alcohol" Linehan Huaxue Yu Gongye (2012), 32(2), 14-20 CODEN: LHYGD7; ISSN: 0253-2417.
Lin, Recycling Technology of Poly(ethylene Terephthalate) Materials; Macromol. Symp. 135, (1998) 129-135.
International Search Report mailed in PCT/US2015/045972 dated Oct. 27, 2015, 3 pages.
International Search Report mailed in PCT/US2015/045978 dated Nov. 25, 2015, 5 pages.
Das et al. "Production of biofuel from chicken feathers" Int Journ. Power Eng and Energy (2013), 4:2; pp. 364-366.
Martelli, et al. "Chicken feather keratin films plasticized with polyethylene glycol" Int. Jour. Poly. Mat Poly. Biomat. (2012), vol. 61, 1, pp. 17-29.

POLYMERIC PLASTICIZER COMPOSITIONS

RELATED APPLICATIONS

This application is a divisional of U.S. patent application Ser. No. 14/959,499, which is a continuation U.S. Application under 35 U.S.C. §365 of International Patent Application No. PCT/US2015/057685, filed Oct. 28, 2015, which claims priority to U.S. Provisional Patent Application Ser. No. 62/072,074 filed Oct. 29, 2014 and U.S. Provisional Patent Application Ser. No. 62/099,930 filed Jan. 5, 2015, the disclosures of each of which are incorporated herein by reference in their entirety.

FIELD OF THE INVENTION

The present invention relates to polymeric plasticizer compositions made from an aromatic acid source, a glycol, and a $C_4$-$C_{36}$ monocarboxylic acid, or ester or anhydride thereof. The aromatic acid source can include polymeric materials such as recycled polyethylene terephthalate (PET). The present invention also relates to methods for making the polymeric plasticizer compositions, to methods of plasticizing polymeric materials, and to plasticized polymeric compositions. The polymeric plasticizers are useful for plasticizing various polymers, such as thermoplastic polymers, including, for example, polyvinyl chloride (PVC). The polymeric plasticizers provide a sustainable alternative to conventional phthalate ester plasticizers, such as diisooctyl phthalate (DOP).

BACKGROUND OF THE INVENTION

Plasticizers are additives used to increase the plasticity or fluidity of materials. Examples of materials that are commonly plasticized include plastics, clays, and concrete. With respect to polymeric materials such as plastics, it has been hypothesized that plasticizers perform their plasticizing function by embedding between the polymer chains, thus spacing them out and increasing the free volume for the polymer. This increase in the free volume results in a lowering of the glass transition temperature ($T_g$) for the polymer, thus rendering it more flexible or malleable, in other words, rendering it more plastic.

An important application of plasticizers is for plasticizing polymeric materials, particularly polyvinyl chloride (PVC). By some estimates, over 90% of the plasticizer market is directed to plasticizing PVC. See, David F. Cadogan and Christopher J. Howick "Plasticizers" in Ullmann's Encyclopedia of Industrial Chemistry 2000, Wiley-VCH, Weinheim. Without the addition of a plasticizer, PVC is a rigid material. PVC can be made softer and more flexible by the addition of plasticizers. Plasticized PVC is used as a replacement for rubber, and has applications in many areas including, for example, pneumatic tires, electrical wire and cable insulation, flooring, coatings, tubing, inflatable products, toys, foams, roofing membranes, food packaging, footwear, coats, sporting gear, magnetic cards, hoses, furniture, exterior siding, bottles, inflatable products, examination gloves, flexible sheeting, gaskets, medical devices, containers, and imitation leather.

The most common plasticizers used for plasticizing PVC and other polymers are esters of polycarboxylic acids with linear or branched chain aliphatic alcohols. Examples of these carboxylic acids are phthalic acid and trimellitic acid. Examples of the aliphatic alcohols used to esterify these acids include $C_6$ to $C_{10}$ alcohols. One of the more widely used plasticizers is diisooctyl phthalate (DIOP or DOP), which is also known by a number of other names including dioctyl phthalate, diethylhexyl phthalate (DEHP), di-2-ethylhexyl phthalate, and bis-2-ethylhexylphthalate.

Despite their utility, plasticizers are not always fully compatible with and leach out of and evaporate from the polymers they are intended to plasticize. For example, it is believed that plasticizers that have leached out of and vaporized from the plastic interior of a car contribute to the characteristic new car smell. The loss of plasticizer from a polymeric material can have negative consequences. Firstly, as the plasticizer is lost from the polymeric material, the surface of the polymer can become sticky or tacky. In some instances the polymeric material releases droplets of plasticizer on its surface. In other words, the polymeric material sweats or weeps. As the plasticizer is continuously lost, the polymeric material can eventually become more rigid and brittle. Thus the desired flexibility characteristics of the polymeric material are lost and the material can fail. Secondly, there are potential health concerns if consumers come in contact with the leached or vaporized plasticizer materials, such as through physical contact or via inhalation or ingestion. Additionally, there are potential environmental concerns due to the leached or vaporized plasticizers being released into the environment. Because of these concerns, there have been movements to limit or ban commonly used plasticizers such as DOP in some countries.

Separate from these safety and environmental concerns with plasticizers, there is an overarching question of sustainability and environmental stewardship in the production and use of products. It would be highly desirable to develop plasticizers that can be prepared from sources other than nonrenewable petrochemical feedstocks. Furthermore, it would be desirable to develop plasticizers that can be prepared by recycling waste streams. The safe disposal or reuse of waste materials from various sources is an environmental and economic challenge. Such wastes had typically gone into landfills, but as landfill capacity is becoming ever scarcer and disposal costs are continuously increasing, cost effective and environmentally acceptable alternatives are needed to deal with these waste materials. For example, a readily available waste stream is produced from waste thermoplastic polyesters, including waste polyethylene terephthalate (PET) streams (e.g., from plastic beverage containers). Therefore, it would be advantageous to find ways to recycle such waste streams into new products.

Regarding the plasticizers themselves, there are the challenges of developing materials having optimal physical and chemical properties. For example, plasticizers that are compatible with and useful for plasticizing PVC should have low acid values, low hydroxyl values, low oxygen ether content, moderate to high molecular weights (in the case of polymeric plasticizers), and viscosities that allow reasonable processing to make plasticized polymeric materials. Plasticizers not meeting the criteria for acid and hydroxyl values can be detrimental to the PVC, causing water uptake of the polymer and more serious issues such as dehydrohalogenation, resulting in acid release, failure of the polymer, and potential damage to materials in contact with the failing polymer. Additionally, the plasticizers should be safe for use in consumer products and not detrimental to the environment. These physical, chemical, safety, and environmental criteria raise difficult technical challenges for developing new plasticizers.

In addition to these forgoing challenges are the technical and economic challenges to cost effectively produce and formulate the plasticizers.

In many instances, it would be highly desirable to have improved plasticizers. It is apparent there is an ongoing need to develop new plasticizers that are compatible with and have the desired technical and performance characteristics for plasticizing polymeric materials such as PVC. It is important that these plasticizers do not easily leach or evaporate from the plasticized polymer and do not have untoward health or environmental concerns. These plasticizers should be technically and economically viable to produce. Furthermore, it would be highly advantageous to develop plasticizers that can be sourced from sustainable sources to employ and reduce waste streams.

We surprisingly found that polymeric plasticizer compositions meeting the foregoing criteria can be made from an aromatic acid source, a glycol, and a component selected from a $C_4$-$C_{36}$ monocarboxylic acid, or ester or anhydride thereof or further comprising a $C_4$-$C_{36}$ alcohol.

SUMMARY OF THE INVENTION

The present invention relates to polymeric plasticizer compositions made from an aromatic acid source, a glycol, and a $C_4$-$C_{36}$ monocarboxylic acid, or ester or anhydride thereof. The aromatic acid source can include polymeric materials such as recycled polyethylene terephthalate (PET). The present invention also relates to methods for making the polymeric plasticizer compositions, to methods of plasticizing polymeric materials, and to plasticized polymeric compositions. The polymeric plasticizers are useful for plasticizing various polymers, such as thermoplastic polymers, including, for example, polyvinyl chloride (PVC). The polymeric plasticizers provide a sustainable alternative to conventional phthalate ester plasticizers, such as diisooctyl phthalate (DOP).

DETAILED DESCRIPTION OF THE INVENTION

The present invention relates to a polymeric plasticizer composition comprising a reaction product of: (a) an aromatic acid source selected from an aromatic diacid, an aromatic diacid anhydride, an aromatic diacid monoester, an aromatic diacid diester, an aromatic linear ester oligomer, an aromatic linear thermoplastic polyester, and combinations thereof; (b) a glycol; and (c) a $C_4$-$C_{36}$ monocarboxylic acid, ester or anhydride thereof.

In one aspect the present invention relates to a polymeric plasticizer composition comprising recurring units derived from: (a) an aromatic acid source selected from an aromatic diacid, an aromatic diacid anhydride, an aromatic diacid monoester, an aromatic diacid diester, an aromatic linear ester oligomer, an aromatic linear thermoplastic polyester, and combinations thereof; (b) a glycol; and (c) a $C_4$-$C_{36}$ monocarboxylic acid, ester or anhydride thereof.

In another aspect the present invention relates to a polymeric plasticizer composition wherein the $C_4$-$C_{36}$ monocarboxylic acid, ester or anhydride thereof is a chain terminator.

In another aspect the present invention relates to a polymeric plasticizer composition wherein the $C_4$-$C_{36}$ monocarboxylic acid, ester or anhydride thereof is further substituted with one or more carbonyl groups.

In another aspect the present invention relates to a polymeric plasticizer composition having a number average molecular weight from 500 to 25,000 grams/mole.

In another aspect the present invention relates to a polymeric plasticizer composition having a number average molecular weight from 800 to 10,000 grams/mole.

In another aspect the present invention relates to a polymeric plasticizer composition having a number average molecular weight from 1000 to 8000 grams/mole.

In another aspect the present invention relates to a polymeric plasticizer composition having an acid value less than 10 mg KOH/g.

In another aspect the present invention relates to a polymeric plasticizer composition having an acid value less than 5 mg KOH/g.

In another aspect the present invention relates to a polymeric plasticizer composition having an acid value less than 2 mg KOH/g.

In another aspect the present invention relates to a polymeric plasticizer composition having a hydroxyl number less than 80 mg KOH/g.

In another aspect the present invention relates to a polymeric plasticizer composition having a hydroxyl number less than 50 mg KOH/g.

In another aspect the present invention relates to a polymeric plasticizer composition having a hydroxyl number less than 30 mg KOH/g.

In another aspect the present invention relates to a polymeric plasticizer composition having a hydroxyl number less than 25 mg KOH/g.

In another aspect the present invention relates to a polymeric plasticizer composition having a polymer backbone ether value less than about 5 percent by weight ether oxygen based on the weight of the polymeric plasticizer composition.

In another aspect the present invention relates to a polymeric plasticizer composition wherein the aromatic acid source is an aromatic linear thermoplastic polyester.

In another aspect the present invention relates to a polymeric plasticizer composition wherein the aromatic linear thermoplastic polyester is selected from polyethylene terephthalate (PET), polybutylene terephthalate, polytrimethylene terephthalate (PTT), polyethylene furanoate, glycol-modified polyethylene terephthalate, copolymers of terephthalic acid and 1,4-cyclohexanedimethanol, isophthalic acid-modified copolymers of terephthalic acid and 1,4-cyclohexanedimethanol, copolymers of 2,5-furandicarboxylic acid and a glycol, copolymers of dialkyl 2,5-furandicarboxylate and a glycol, dihydroferulic acid polymers, copolymers of 2,2,4,4-tetramethyl-1,3-cyclobutanediol with isophthalic acid, terephthalic acid or orthophthalic derivatives, and combinations thereof.

In another aspect the present invention relates to a polymeric plasticizer composition wherein the aromatic linear thermoplastic polyester is selected from virgin polyethylene terephthalate, recycled polyethylene terephthalate, and combinations thereof.

In another aspect the present invention relates to a polymeric plasticizer further comprising a thermoplastic polycarbonate, a thermoplastic polycarbonate blend with a thermoplastic polyester, a thermoplastic polycarbonate transreaction product with a thermoplastic polyester, and combinations thereof.

In another aspect the present invention relates to a polymeric plasticizer composition further comprising poly(bisphenol-A carbonate), a blend or transreaction product of poly(bisphenol-A carbonate) and polyethylene terephthalate, a blend or transreaction product of poly(bisphenol-A carbonate) and polybutylene terephthalate, and combinations thereof.

In another aspect the present invention relates to a polymeric plasticizer composition wherein the glycol is selected from ethylene glycol, propylene glycol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 2-methyl-1,3-propanediol, neopentyl glycol, glycerol, trimethylolpropane, 3-methyl-1,5-pentanediol, 1,4-cyclohexanedimethanol, 1,3-cyclohexanedimethanol, diethylene glycol, tetraethylene glycol, dipropylene glycol, triethylene glycol, tripropylene glycol, polyethylene glycol, polypropylene glycol, polycarbonate polyols, pentaerythritol, sorbitol, and block or random copolymer glycols of ethylene oxide and propylene oxide, aliphatic polyester polyols, 2,2,4,4-tetramethyl-1,3-cyclobutanediol, and combinations thereof.

In another aspect the present invention relates to a polymeric plasticizer composition wherein the glycol is selected from ethylene glycol, propylene glycol, 1,3-propanediol, 1,2-butanediol, 1,3-butanediol, 1,4-butanediol, 1,4-hexanediol, 2-methyl-1,3-propanediol, neopentyl glycol, glycerol, trimethylolpropane, 3-methyl-1,5-pentanediol, 1,4-cyclohexanedimethanol, diethylene glycol, tetraethylene glycol, dipropylene glycol, triethylene glycol, tripropylene glycol, pentaerythritol, sorbitol, and combinations thereof.

In another aspect the present invention relates to a polymeric plasticizer composition wherein the glycol is selected from 1,3-butanediol, 1,4-butanediol, propylene glycol, glycerol, neopentyl glycol, and combinations thereof.

In another aspect the present invention relates to a polymeric plasticizer composition wherein the $C_4$-$C_{36}$ monocarboxylic acid is selected from benzoic acid, phenylacetic acid, branched or linear saturated or unsaturated alkyl carboxylic acids, naphthenic acid, norbornene carboxylic acid, 2-furoic acid, decanoic acid, undecanoic acid, dodecanoic acid, tridecanoic acid, tetradecanoic acid, neodecanoic acid, 2-butyloctanoic acid, 2-ethylhexanoic acid, and combinations thereof, including esters and anhydrides of these $C_4$-$C_{36}$ monocarboxylic acids.

In another aspect the present invention relates to a polymeric plasticizer composition wherein the $C_4$-$C_{36}$ monocarboxylic acid is substituted with one or more carbonyl groups.

In another aspect the present invention relates to a polymeric plasticizer composition wherein the carbonyl substituted $C_4$-$C_{36}$ monocarboxylic acid is levulinic acid, or an ester or anhydride thereof.

In another aspect the present invention relates to a polymeric plasticizer composition wherein the $C_4$-$C_{36}$ monocarboxylic acid ester is a $C_1$-$C_7$ alcohol ester of a $C_4$-$C_{36}$ monocarboxylic acid.

In another aspect the present invention relates to a polymeric plasticizer composition wherein the $C_4$-$C_{36}$ monocarboxylic acid ester is selected from alkyl benzoates, alkyl phenylacetates, alkyl esters of branched or linear saturated or unsaturated alkyl carboxylic acids, alkyl naphthenoates, alkyl norbornene carboxylates, alkyl 2-furoates, and combinations thereof.

In another aspect the present invention relates to a polymeric plasticizer composition wherein the $C_4$-$C_{36}$ monocarboxylic anhydride is selected from anhydrides of benzoic acid, phenylacetic acid, branched or linear saturated or unsaturated alkyl carboxylic acids, naphthenic acid, norbornene carboxylic acid, 2-furoic acid, and combinations thereof.

In another aspect the present invention relates to a polymeric plasticizer composition further comprising a $C_4$-$C_{36}$ alcohol.

In another aspect the present invention relates to a polymeric plasticizer composition wherein the $C_4$-$C_{36}$ alcohol is selected from norborneol, alkoxylates of branched or linear alkyl phenols, branched or linear saturated or unsaturated alkyl alcohols, alkoxylated branched or linear saturated or unsaturated alkyl alcohols, 2-phenoxy ethanol, 2-phenoxy propanol, benzyl alcohol, furfuryl alcohol, alkoxylated furfuryl alcohol, 2-(hydroxymethyl)tetrahydrofuran, 6,6-dimethyl-2-norpinen-2-ethanol, and alkoxylated 6,6-dimethyl-2-norpinen-2-ethanol, cyclohexanol, alkoxylated cyclohexanol, 2-cyclohexylethanol, alkoxylated 2-cyclohexyl ethanol, 2-cyclohexyloxyethanol, 1-ethynyl-1-cyclohexanol, 2-phenylethanol, alkoxylated 2-phenyl ethanol, alkoxylated phenols, alkoxylated norborneol, farnesol, hydrogenated farnesol, geraniol, hydrogenated geraniol, and combinations thereof.

In another aspect the present invention relates to a polymeric plasticizer composition further comprising a $C_3$-$C_{36}$ saturated or unsaturated aliphatic linear, branched, or cyclic polyacid or hydroxyl substituted polyacid, or esters or anhydrides thereof.

In another aspect the present invention relates to a polymeric plasticizer composition wherein the $C_3$-$C_{36}$ saturated or unsaturated aliphatic linear, branched, or cyclic polyacid or hydroxyl substituted polyacid, or esters or anhydrides thereof, and combinations thereof, wherein the foregoing polyacid described in this sentence is a diacid.

In another aspect the present invention relates to a polymeric plasticizer composition wherein the diacid is selected from succinic acid, glutaric acid, pimelic acid, suberic acid, succinic acid, azelaic acid, sebacic acid, adipic acid, fumaric acid, maleic acid, 1,2-cyclohexane dicarboxylic acid, 1,3-cyclohexane dicarboxylic acid, 1,4-cyclohexane dicarboxylic acid, 2,5-furan dicarboxylic acid, 1,9-nonanedioic acid, 1,9-nonenedioic acid, 1,10-decanedioic acid, 1,10, decenedioic acid, 1,11-undecanedioic acid, 1,11-undecenedioic acid, 1,18-octadecanedioic acid, 1,18-octadecenedioic acid, 1,12-dodecanedioic acid, 1,12-dodecenedioic acid, 1,14-tetradecanedioic acid, 1,14-tetradecenedioic acid, 1,16-hexadecanedioic acid, 1,16-hexadecenedioic acid, eicosenedioic acid, eicosanedioic acid, docosanedioic acid; tetracosanedioic acid, tetracosenedioic acid, and combinations thereof.

In another aspect the present invention relates to a polymeric plasticizer composition wherein the $C_3$-$C_{36}$ saturated or unsaturated aliphatic linear, branched, or cyclic polyacid or hydroxyl substituted polyacid, or esters or anhydrides thereof, and combinations thereof, is a dimer fatty acid.

In another aspect the present invention relates to a polymeric plasticizer composition further comprising a hydroxyl substituted $C_3$-$C_{36}$ monocarboxylic acid, or ester or anhydride thereof, and combinations thereof.

In another aspect the present invention relates to a polymeric plasticizer composition wherein the hydroxyl substituted $C_3$-$C_{36}$ monocarboxylic acid, or ester or anhydride thereof is selected from 12-hydroxy stearic acid, ricinoleic acid, an alkyl levulinate triol ketal, lactic acid, and combinations thereof.

In another aspect the present invention relates to a polymeric plasticizer composition wherein the hydroxyl substituted $C_3$-$C_{36}$ monocarboxylic acid, or ester or anhydride thereof is an alkyl levulinate glycerol ketal.

In another aspect the present invention relates to a polymeric plasticizer composition wherein the hydroxyl substituted $C_3$-$C_{36}$ monocarboxylic acid, or ester or anhydride thereof is ethyl levulinate glycerol ketal.

In another aspect the present invention relates to a polymeric plasticizer composition further comprising an aromatic triacid or aromatic tetraacid, or esters or anhydrides thereof, and combinations thereof; wherein at least one or more of the following (a), (b), or (c) apply to the polymeric plasticizer composition: (a) the polymeric plasticizer composition has an acid value of less than 5 mg KOH/g, (b) the $C_4$-$C_{36}$ alcohol is not a $C_8$-$C_{12}$ alcohol, or (c) the $C_4$-$C_{36}$ monocarboxylic acid, or ester or anhydride thereof is not a $C_{12}$-$C_{18}$ monocarboxylic acid.

In another aspect the present invention relates to a polymeric plasticizer composition further comprising a hydrophobe.

In another aspect the present invention relates to a polymeric plasticizer composition wherein the hydrophobe is selected from ricinoleic acid, castor oil, ethoxylated castor oil, vegetable oils, fatty acids, fatty acid esters, modified vegetable oils, fatty triglycerides, cardanol-derived products, recycled cooking oil, hydroxy-functional materials derived from epoxidized, ozonized, or hydroformylated fatty esters or fatty acids, alkoxylated alkyl phenols, alkoxylated fatty alcohols, and combinations thereof.

In another aspect the present invention relates to a polymeric plasticizer composition wherein one or more of the following apply: (a) the weight ratio of aromatic acid source in the polymeric plasticizer composition is from 5 to 90 weight percent, (b) the weight ratio of glycol in the polymeric plasticizer composition is from 5 to 70 weight percent, or (c) the weight ratio of the $C_4$-$C_{36}$ monocarboxylic acid, or ester or anhydride thereof is from 5 to 80 weight percent.

In another aspect the present invention relates to a polymeric plasticizer composition having a recycle content as defined herein greater than 10 weight percent.

In another aspect the present invention relates to a polymeric plasticizer composition having a recycle content as defined herein greater than 30 weight percent.

In another aspect the present invention relates to a polymeric plasticizer composition having a recycle content as defined herein greater than 50 weight percent.

In another aspect the present invention relates to a polymeric plasticizer composition having a recycle content as defined herein greater than 75 weight percent.

In another aspect the present invention relates to a plasticized thermoplastic polymer composition comprising (a) from 10% to 80% by weight percent of a polymeric plasticizer composition, and (b) from 20% to 90% by weight of a thermoplastic polymer (that is, a thermoplastic polymeric material).

In another aspect the present invention relates to a plasticized composition wherein the thermoplastic polymer is selected from polyvinyl chloride, polyethylene terephthalate, nitrile butyl rubber, acrylonitrile-butadiene rubber, polyvinyl chloride polyvinyl alcohol copolymers, acrylates, natural & synthetic rubber, cellulose acetate butyrate, cellulose nitrate, ethyl cellulose, polyvinyl butyral, chlorinated rubber, polyisoprene, styrene butadiene copolymers, butadiene, halobutyl rubber and combinations thereof.

In another aspect the present invention relates to a plasticized composition wherein the thermoplastic polymer is polyvinyl chloride.

In another aspect the present invention relates to a plasticizer composition or a plasticized composition further comprising an additional plasticizer.

In another aspect the present invention relates to a plasticizer composition or a plasticized composition wherein the additional plasticizer is selected from di (2-ethylhexyl) phthalate, diisononyl phthalate, di-n-butylphthalate, butyl benzyl phthalate, diisodecyl phthalate, dioctyl phthalate, diethyl phthalate, diisobutyl phthalate, di-n-hexyl phthalate, trimethyl trimellitate, tri-(2-ethylhexyl) trimellitate, tri-(n-octyl,n-decyl) trimellitate, tri-(heptyl,nonyl) trimellitate, n-octyl trimellitate, bis(2-ethylhexyl)adipate, dimethyl adipate, monomethyl adipate, dioctyl adipate, dibutyl sebacate, dibutyl maleate, diisobutyl maleate, benzoates, dioctyl terephthalate/DEHT, 1,2-cyclohexane dicarboxylic acid, diisononyl ester, epoxidized vegetable oils, alkyl sulphonic acid phenyl ester, sulfonamides, N-ethyl toluene sulfonamide, ortho and para isomers, N-(2-hydroxypropyl) benzene sulfonamide, N-(n-butyl) benzene sulfonamide, organophosphates, tricresyl phosphate, tributyl phosphate, glycols/polyethers, triethylene glycol dihexanoate, tetraethylene glycol diheptanoate, polybutene, acetylated monoglycerides, alkyl citrates, triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trimethyl citrate, and combinations thereof.

In another aspect the present invention relates to a process for preparing a polymeric plasticizer composition comprising reacting: (a) an aromatic acid source selected from an aromatic diacid, an aromatic diacid anhydride, an aromatic diacid monoester, an aromatic diacid diester, an aromatic linear ester oligomer, an aromatic linear thermoplastic polyester, and combinations thereof; (b) a glycol; and (c) a $C_4$-$C_{36}$ monocarboxylic acid, or ester or anhydride thereof at a temperature between 80° C. and 260° C.

In another aspect the present invention relates to a process for preparing a polymeric plasticizer further comprising performing the reaction in the presence a catalyst.

In another aspect the present invention relates to a process for preparing a polymeric plasticizer composition wherein the catalyst is selected from titanium catalysts, tin catalysts, and combinations thereof.

In another aspect the present invention relates to a process for preparing a polymeric plasticizer composition wherein the catalyst is selected from butyltin tris-2-ethylhexanoate, butylstannoic acid, dibutyltin oxide, tetra-n-butyl titanate, triethanolamine titanium, titanium tetra-isopropoxide, and combinations thereof.

In another aspect the present invention relates to a process for preparing a polymeric plasticizer further comprising reacting a $C_4$-$C_{36}$ alcohol.

In another aspect the present invention relates to a process for preparing a polymeric plasticizer further comprising reacting a $C_3$-$C_{36}$ saturated or unsaturated aliphatic linear, branched, or cyclic polyacid or hydroxyl substituted polyacid, or esters or anhydrides thereof.

In another aspect the present invention relates to a process for preparing a polymeric plasticizer further comprising reacting a hydroxyl substituted $C_3$-$C_{36}$ monocarboxylic acid, or ester or anhydride thereof, and combinations thereof.

In another aspect the present invention relates to a process for preparing a polymeric plasticizer further comprising reacting an aromatic triacid or aromatic tetraacid, or esters or anhydrides thereof, and combinations thereof; where at least one or more of the following (a), (b), or (c) apply: (a) the polymeric plasticizer composition has an acid value of less than 5 mg KOH/g, (b) the $C_4$-$C_{36}$ alcohol is not a $C_8$-$C_{12}$ alcohol, or (c) the $C_4$-$C_{36}$ monocarboxylic acid, or ester or anhydride thereof is not a $C_{12}$-$C_{18}$ monocarboxylic acid.

In another aspect the present invention relates to process for preparing a polymeric plasticizer further comprising reacting a hydrophobe.

In another aspect the present invention relates to method of plasticizing a thermoplastic polymeric material comprising, combining: (a) from 10% to 80% by weight percent of a polymeric plasticizer composition and (b) from 20% to 90% by weight of a thermoplastic polymer.

In another aspect the present invention relates to a method of plasticizing a thermoplastic polymeric material wherein the thermoplastic polymer is selected from polyvinyl chloride, polyethylene terephthalate, nitrile butyl rubber, acrylonitrile-butadiene rubber, polyvinyl chloride polyvinyl alcohol copolymers, acrylates, natural & synthetic rubber, cellulose acetate butyrate, cellulose nitrate, ethyl cellulose, polyvinyl butyral, chlorinated rubber, polyisoprene, styrene butadiene copolymers, butadiene, halobutyl rubber and combinations thereof.

In another aspect the present invention relates to a method of plasticizing a thermoplastic polymeric material, wherein the thermoplastic polymeric material is polyvinyl chloride.

Definitions

As used herein, the following terms have the indicated meanings unless expressly stated to the contrary:

The term "aliphatic" as used herein refers to a chemical compound belonging to the organic class in which the atoms are not linked together to form an aromatic ring. One of the major structural groups of organic molecules, the aliphatic compounds include the alkanes, alkenes, and alkynes, including linear, branched, and cyclic variants, and substances derived from them—actually or in principle—by replacing one or more hydrogen atoms by atoms of other elements or groups of atoms. See, Encyclopaedia Brittanica, entry which is incorporated by reference herein in its entirety.

The term "aromatic" as used herein refers to a compound, any of a large class of unsaturated chemical compounds characterized by one or more planar rings of atoms joined by covalent bonds, which in some depictions are shown as alternating single and double bonds. The characteristic properties of these compounds is referred to as aromaticity. Although the term aromatic originally concerned odor, today its use in chemistry is restricted to compounds that have particular electronic, structural, or chemical properties. Aromaticity results from particular bonding arrangements that cause certain π (pi) electrons within a molecule to be strongly held. Aromaticity is often reflected in smaller than expected heats of combustion and hydrogenation and is associated with low reactivity. Benzene ($C_6H_6$) is the best-known aromatic compound and the parent to which numerous other aromatic compounds are related. See, Encyclopaedia Brittanica, which is incorporated by reference herein.

The terms referring to carbon numbers, such as for example $C_4$-$C_{36}$ means that the chemical group or compounds it is referring to contains the indicated number of carbons or range of carbons, in this example being from four carbon atoms to 36 carbon atoms. This carbon numbering convention is standard and well known in the art.

The term "polymer backbone ether value" as used herein refers to the oxygen ether content of the polymeric plasticizer composition. In other words, the polymer backbone ether value is the ratio of the total oxygen ether mass to the mass of the entire polymeric plasticizer, expressed as a weight percentage. The polymer backbone ether value is calculated as follows as illustrated for a simple chemical compound such as triethylene glycol. Triethylene glycol, which contains two ether oxygens, has a molecular weight (molar mass) of 150.17 grams/mole.

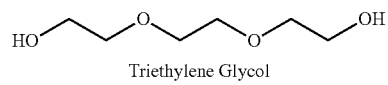

Triethylene Glycol

The two ether oxygens of triethylene glycol account for a total mass of 31.9988 amu (2×15.9994=31.9988). This total ether oxygen mass is divided by the molar mass for triethylene glycol and the result is multiplied by 100% to give a weight percentage. For triethylene glycol the polymer backbone ether value is therefore 21.31 weight percent (31.9988 divided by 150.17×100%=21.31%).

The term "polymeric plasticizer composition" as used herein means that the plasticizer composition comprises a polymeric material. The polymeric plasticizer is in contrast to monomeric (not containing repeating monomeric units) or other lower molecular weight plasticizers. An example of such a monomeric or lower molecular weight plasticizer is diisooctyl phthalate (DOP), which has a molecular weight of 390.56 grams/mole.

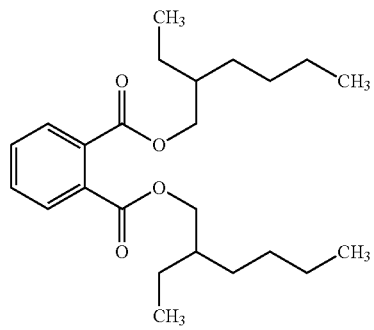

Diisoctyl Phthalate (DOP)

The polymeric plasticizer compositions useful herein generally have a number average molecular weight from 500 to 25,000 grams/mole. In other embodiments these plasticizers have a number average molecular weight from 800 to 10,000 grams/mole, and in yet other embodiments these plasticizers have a number average molecular weight from 1000 to 8000 grams/mole.

"Recycle content" as used herein, is determined on a weight percentage basis by combining the masses of any of the recycled sources used in the preparation of the polymeric plasticizer composition and dividing by the total mass of the polymeric plasticizer composition and multiplying the result by 100 percent.

The term "recycled polymer" as used herein refers to a polymer that has little value after its original lifespan has ended, and is recovered in an economically viable fashion from the original spent application for use in other applications. An example of a recycle polymer is polyethylene terephthalate (PET).

The term "waste stream" as used herein refers to waste or discarded products from industry, agriculture, or consumer sources that have few ultimate destinations or applications other than for example, landfill, incineration, animal feed, concrete, burning as a source of energy, fertilization, landscaping mulch, or other relatively low value applications.

Polymeric Plasticizer Compositions

As stated above, the polymeric plasticizer compositions are polymer materials, in contrast to monomeric or other lower molecular weight plasticizers. These polymeric plasticizers are made from, or in other words are the reaction product of, an aromatic acid source, a glycol, and certain monocarboxylic acid compounds, or esters or anhydrides thereof. These polymeric plasticizers can in some embodiments further comprise additional components. Another way of describing these polymeric plasticizers is that they comprise repeating units of materials, where the materials are derived from an aromatic acid source, a glycol, and certain monocarboxylic acid compounds, or esters or anhydrides thereof, and any further additional components.

Aromatic Acid Source

The polymeric plasticizer compositions and processes of the present invention comprise an aromatic acid source. The aromatic acid source can be selected from an aromatic diacid, an aromatic diacid anhydride, an aromatic diacid monoester, an aromatic diacid diester, an aromatic linear ester oligomer, an aromatic linear thermoplastic polyester, and combinations thereof. The aromatic acid source can be obtained from recycled polymers and waste streams. In fact, in view of green chemistry and sustainability considerations, it is highly desirable to use aromatic acid sources from such recycled polymers and waste streams.

Examples of aromatic diacids include phthalic acid, such as 1,2 (or ortho), 1,3 (or meta), and 1,4 (or para) phthalic acids, the various dicarboxylic acids of naphthalene, a non-limiting example of which is 1,2-naphthalene dicarboxylic acid, and the dicarboxylic acids of furan, an example of which is 2,5-furan dicarboxylic acid. Anhydrides, as well as the mono (or half) esters and diesters of these dicarboxylic acids are contemplated. Another aromatic acid source is aromatic linear ester oligomers such as oligomers which can be derived from thermoplastic polyesters. Oligomers generally are made up of just a few monomer units. Also, thermoplastic aromatic polyesters, namely the polymeric materials themselves, are useful aromatic acid sources, provided these thermoplastic polyesters are linear, i.e., not containing aromatic tri- or tetra-acids. Thermoplastic polyesters are condensation polymers produced from the reaction of glycols and aromatic dicarboxylic acids or acid derivatives.

Examples of such thermoplastic polyesters include polyethylene terephthalate (PET), polybutylene terephthalate, polytrimethylene terephthalate, polyethylene furanoate, glycol-modified polyethylene terephthalate, copolymers of terephthalic acid and 1,4-cyclohexanedimethanol, isophthalic acid-modified copolymers of terephthalic acid and 1,4-cyclohexanedimethanol, copolymers of 2,5-furandicarboxylic acid and a glycol, copolymers of dialkyl 2,5-furandicarboxylate and a glycol, dihydroferulic acid polymers, copolymers of 2,2,4,4-tetramethyl-1,3-cyclobutanediol with isophthalic acid, terephthalic acid or orthophthalic derivatives, and combinations thereof. See PCT International. Appl. No. WO 2014/075057; *Modern Polyesters: Chemistry and Technology of Polyesters and Copolyesters*, J. Scheirs and T. Long, eds., Wiley Series in Polymer Science, 2003, John Wiley & Sons, Ltd. Hoboken, N.J.; Chapters 18-20 of *Handbook of Thermoplastics*, O. Olabisi, ed., 1997, Marcel Dekker, Inc. New York; and U.S. Pat. Appl. Publ. No. 2009/0131625, the disclosures of which are incorporated herein by reference.

Suitable thermoplastic polyesters include virgin polyesters, recycled polyesters, or mixtures thereof. Polyethylene terephthalate (PET) is particularly preferred, especially recycled polyethylene terephthalate (rPET), virgin PET, and mixtures thereof. For more examples of suitable thermoplastic polyesters, see U.S. Pat. Appl. Publ. No. 2009/0131625, the teachings of which are incorporated herein by reference.

Recycled polyethylene terephthalate suitable for use in making the inventive polymeric plasticizer compositions can come from a variety of sources. The most common source is the post-consumer waste stream of PET from plastic bottles or other containers. Another possible source is from the post-industrial waste stream of PET from the production of fibers, bottles, or other containers or articles. The recycled PET (rPET) can be colorless or contain dyes (e.g., green, blue, brown, or other colors) or be mixtures of these. A minor proportion of organic or inorganic foreign matter (e.g., paper, other plastics, glass, metal, etc.) can be present. A desirable source of rPET is "flake" rPET, from which many of the common impurities present in scrap PET bottles have been removed in advance. Another desirable source of rPET is pelletized rPET, which is made by melting and extruding rPET through metal filtration mesh to further remove particulate impurities. Because PET plastic bottles are currently manufactured in much greater quantity than any recycling efforts can match, scrap PET will continue to be available in abundance.

Glycols

The polymeric plasticizer compositions and processes of the present invention comprise a glycol. Glycols suitable for use herein are well known. By "glycol," is meant a linear or branched, aliphatic or cyclic, aliphatic compound or mixture of compounds having two or more hydroxyl groups. Other functionalities, particularly ether or ester groups, may be present in the glycol. In preferred glycols, two of the hydroxyl groups are separated by from 2 to about 20 carbon atoms, preferably from about 2 to about 14 carbon atoms, and more preferably from about 2 to about 8 carbon atoms. Note that ether linkages may be included in the carbon separation between hydroxyl groups, though the oxygen atoms are not included in the carbon count. Suitable glycols include, for example, ethylene glycol, propylene glycol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 2-methyl-1,3-propanediol, neopentyl glycol, glycerol (also known as glycerin or glycerine), trimethylolpropane, 3-methyl-1,5-pentanediol, 1,4-cyclohexanedimethanol, 1,3-cyclohexanedimethanol, diethylene glycol, tetraethylene glycol, dipropylene glycol, triethylene glycol, tripropylene glycol, polyethylene glycol, polypropylene glycol, polycarbonate polyols, pentaerythritol, sorbitol, and block or random copolymer glycols of ethylene oxide and propylene oxide, aliphatic polyester polyols, 2,2,4,4-tetramethyl-1,3-cyclobutanediol, and combinations thereof.

$C_4$-$C_{36}$ Monocarboxylic Acids, Esters, and Anhydrides

The polymeric plasticizer compositions and processes of the present invention comprise a $C_4$-$C_{36}$ monocarboxylic acid, or ester or anhydride thereof. By "monocarboxylic acid", it is meant that the acid, or the ester or anhydride derived therefrom is based on a carboxylic acid compound having a single carboxylic acid group. An example of such a carboxylic acid is the $C_6$ monocarboxylic acid, hexanoic acid. An example of an ester is the ethyl ester of hexanoic acid, which is known as ethyl hexanoate. An example of an anhydride is hexanoic acid anhydride, which is also known as hexanoic anhydride. Also, the anhydride can be a mixed anhydride from two different carboxylic acids, as long as one of the acids is from a $C_4$-$C_{36}$ monocarboxylic acid. Such an example would be the mixed anhydride of hexanoic acid (a $C_6$ monocarboxylic acid, which meets the $C_4$-$C_{36}$ requirement) and acetic acid (a $C_2$ acid).

In general, the $C_4$-$C_{36}$ monocarboxylic acid, or ester or anhydride thereof can function as a chain terminator in the preparation of the polymeric plasticizer compositions, because when it is incorporated into the polymerization reaction, it can cap the ends of the polymer chain structure.

The $C_4$-$C_{36}$ monocarboxylic acid, or ester or anhydride thereof can be selected from straight, branched or cyclic aliphatic compounds that can be either saturated or unsaturated. Furthermore, aromatic compounds are also intended. Additionally, for the esters, the alcohol-derived portion is preferably derived from an alcohol having from one to seven carbon atoms, i.e. $C_1$ to $C_7$. Also, for the foregoing compounds described in this paragraph, the carbon backbones can be further substituted with one or more carbonyl —(C=O)— groups.

Examples of $C_4$-$C_{36}$ monocarboxylic acids include benzoic acid, phenylacetic acid, branched or linear saturated or unsaturated alkyl carboxylic acids, naphthenic acid, norbornene carboxylic acid, 2-furoic acid, decanoic acid, undecanoic acid, dodecanoic acid, tridecanoic acid, tetradecanoic acid, neodecanoic acid, 2-butyloctanoic acid, 2-ethylhexanoic acid, and combinations thereof. $C_4$-$C_{36}$ monocarboxylic acids in which the carbon backbone is further substituted with one or more carbonyl groups (=O) are useful herein, an example being levulinic acid.

Examples of $C_4$-$C_{36}$ monocarboxylic acid esters include $C_1$ to $C_7$ alcohol esters of the $C_4$-$C_{36}$ monocarboxylic acids, in other words $C_4$-$C_{36}$ monocarboxylic acids that have been esterified with $C_1$ to $C_7$ alcohols. These $C_1$ to $C_7$ alcohols can include aromatic alcohols. Examples of $C_4$-$C_{36}$ monocarboxylic acid esters include alkyl benzoates, alkyl phenylacetates, alkyl esters of branched or linear saturated or unsaturated alkyl carboxylic acids, alkyl naphthenoates, alkyl norbornene carboxylates, alkyl 2-furoates, and combinations thereof.

Examples of $C_4$-$C_{36}$ monocarboxylic anhydrides include anhydrides of benzoic acid, benzene acetic acid, branched or linear saturated or unsaturated alkyl carboxylic acids, naphthenic acid, norbornene carboxylic acid, 2-furoic acid, and combinations thereof. Additionally, the anhydrides can include mixed anhydrides derived from two different carboxylic acids, such as a mixed anhydride of benzoic acid and benzene acetic acid.

Other Components of the Polymeric Plasticizer Compositions

The polymeric plasticizer compositions and processes of the present invention can, in some embodiments comprise further components. In some cases, these other components can function as a chain builder in the preparation of the polymeric plasticizer compositions, because when incorporated into the polymer chain they tend to contribute to further the polymerization reaction, thereby increasing the molecular weight of the resultant polymer.

$C_4$-$C_{36}$ Mono Alcohols

The polymeric plasticizer compositions and processes of the present invention can further comprise a $C_4$-$C_{36}$ mono alcohol. It is understood that these $C_4$-$C_{36}$ alcohols are intended to be distinct from the required glycol (i.e. the diol) of the present invention. It is intended that alcohols lower than $C_4$ generally are too volatile and do not have desirable characteristics for incorporation herein. The $C_4$-$C_{36}$ alcohol can be selected from straight, branched or cyclic aliphatic compounds that can be either saturated or unsaturated. Aromatic compounds are also intended. Also, alkoxylated alcohols are contemplated herein.

Useful $C_4$-$C_{36}$ alcohols include those selected from norborneol, alkoxylates of branched or linear alkyl phenols, branched or linear saturated or unsaturated alkyl alcohols, alkoxylated branched or linear saturated or unsaturated alkyl alcohols, 2-phenoxy ethanol, 2-phenoxy propanol, benzyl alcohol, furfuryl alcohol, alkoxylated furfuryl alcohol, 2-(hydroxymethyl)tetrahydrofuran, 6,6-dimethyl-2-norpinen-2-ethanol, and alkoxylated 6,6-dimethyl-2-norpinen-2-ethanol, cyclohexanol, alkoxylated cyclohexanol, 2-cyclohexylethanol, alkoxylated 2-cyclohexyl ethanol, 2-cyclohexyloxyethanol, 1-ethynyl-1-cyclohexanol, 2-phenylethanol, alkoxylated 2-phenyl ethanol, alkoxylated phenols, alkoxylated norborneol, farnesol, hydrogenated farnesol, geraniol, hydrogenated geraniol, and combinations thereof.

Aliphatic Polyacids

The polymeric plasticizer compositions and processes of the present invention can further comprise a $C_3$-$C_{36}$ saturated or unsaturated aliphatic linear, branched, or cyclic polyacid, or esters or anhydrides thereof. By polyacid is meant that the acid compound contains two or more carboxylate groups. Diacids as well as dimer fatty acids are intended, as well as polyacids having three (triacids), four (tetraacids), or more carboxylate groups. Dimer fatty acids, or dimerized fatty acids is a term used in the art to describe dicarboxylic acids prepared by dimerizing unsaturated fatty acids. Also, for the foregoing compounds described in this paragraph, the carbon backbones can be further substituted with one or substituents including for example, —F, —OH, —SH, and carbonyl —(C=O)—. An example of such an acid useful herein is citric acid.

Examples of diacids include succinic acid, glutaric acid, pimelic acid, suberic acid, succinic acid, pimelic acid azelaic acid, sebacic acid, adipic acid, fumaric acid, maleic acid, 1,2-cyclohexane dicarboxylic acid, 1,3-cyclohexane dicarboxylic acid, 1,4-cyclohexane dicarboxylic acid, 2,5-furan dicarboxylic acid, 1,9-nonanedioic acid, 1,9-nonenedioic acid, 1,10-decanedioic acid, 1,10-decenedioic acid, 1,11-undecanedioic acid, 1,11-undecenedioic acid, 1,18-octadecanedioic acid, 1,18-octadecenedioic acid, 1,12-dodecanedioic acid, 1,12-dodecenedioic acid, 1,14-tetradecanedioic acid, 1,14-tetradecenedioic acid, 1,16-hexadecanedioic acid, 1,16-hexadecenedioic acid, eicosanedioic acid, eicosanedioic acid, docosanedioic acid, tetracosanedioic acid, tetracosenedioic acid, and combinations thereof. Esters and anhydrides of the fatty diacids are also contemplated herein.

Dimer fatty acids are made by dimerizing unsaturated fatty acids (e.g., oleic acid, linoleic acid, linolenic acid, ricinoleic acid) in the presence of a catalyst, such as a bentonite or montmorillonite clay. Commercially available dimer fatty acids are usually mixtures of products in which the dimerized product predominates, however, trimerized products may also result and be included as a significant portion of the dimer fatty acid product, and are included herein in this definition. Some commercial dimer acids are made by dimerizing tall oil fatty acids. Dimer fatty acids frequently have 36 carbons and two carboxylic acid groups. However, the trimerized co-products may contain 54 carbons. They may be saturated or unsaturated. They may also be hydrogenated to remove unsaturation. In a preferred aspect, the dimer fatty acid comprises dimerized oleic acid, trimerized oleic acid, dimerized linoleic acid, trimerized linoleic acid, dimerized linolenic acid, trimerized linolenic acid, or mixtures thereof. Suitable dimer fatty acids include Pripol™ dimer fatty acids (products of Croda) such as Pripol™ 1006, 1009, 1010, 1012, 1013, 1017, 1022, 1025, 1027, 1029, 1036, and 1098; Unidyme™ dimer acids (products of Arizona Chemical) such as Unidyme 10, 14, 18, 22, 35, M15, and M35; dimer acids available from Emery Oleochemicals, and FloraDyme™ dimer acids from Florachem Corporation. Methods for synthesizing dimer fatty acids suitable for use are also known. Fatty acids having at least one carbon-carbon double bond are dimerized in the presence of a catalyst such as a montmorillonite, kaolinite, hectorite, or attapulgite clay (see, e.g., U.S. Pat. Nos. 2,793,220, 4,371,469, 5,138,027, and 6,281,373, the teachings of which are incorporated herein by reference; see also WO 2000/075252 and CA 104511).

Hydroxyl Substituted $C_3$-$C_{36}$ Carboxylic Acids

The polymeric plasticizer compositions and processes of the present invention can further comprise a hydroxyl substituted $C_3$-$C_{36}$ carboxylic acid, or ester or anhydride thereof, and combinations thereof. Generally, these hydroxyl substituted, or hydroxy acids, are aliphatic monocarboxylic acids and can be straight, branched or cyclic, and can be saturated or unsaturated. Examples of these hydroxyl acids include 12-hydroxy stearic acid, ricinoleic acid, citric acid, lactic acid, and combinations thereof.

Hydroxyl substituted carboxylic acids are further described in U.S. Pat. No. 5,206,341, to Ibay et al., issued Apr. 27, 1993, which is incorporated by reference herein in its entirety. Also, polyhydroxyalkanoates (PHAs) are useful herein. PHAs are naturally produced by numerous microorganisms as energy reserve materials in the presence of an excess carbon source when an essential nutrient, such as nitrogen or phosphorous is available only in limiting concentrations. PHAs also form part of depsipeptides, biooligomers ubiquitous in nature which are composed of hydroxyl and amino acids linked by amide and ester bonds.

Included within the definition of hydroxyl substituted $C_3$-$C_{36}$ carboxylic acids, or esters or anhydrides thereof are compounds such as alkyl levulinate triol ketals. These compounds have a free hydroxyl group and are intended to meet the definition, and are distinct from the optionally carbonyl-containing $C_4$-$C_{36}$ monocarboxylic acids, or ester or anhydride thereof also described herein, an example of which was levulinic acid (which does not have a hydroxyl group). An example of an alkyl levulinate triol ketal is ethyl levulinate glycerol ketal.

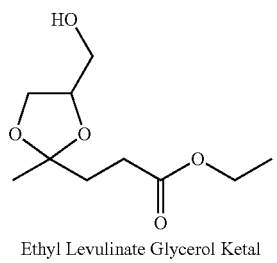

Ethyl Levulinate Glycerol Ketal

In some aspects, the polymeric plasticizer compositions and processes comprise recurring units from a hydroxy-functional ketal acid, ester or anhydride. Suitable hydroxy-functional ketal acids, esters, and anhydrides can be made by reacting oxocarboxylates with a triol, preferably in the presence of an acid catalyst. As used herein, and for convenience, "ketal" refers to either a hydroxy-functional ketal (reaction product of a triol and a ketone) or a hydroxy-functional acetal (reaction product of a triol and an aldehyde).

Suitable oxocarboxylates have a ketone or aldehyde ("oxo") functionality in addition to a carboxylate (acid, ester, or anhydride) functionality. The carbonyl groups of the ketone or aldehyde may or may not be separated by one or more carbons from the acid, ester, or amide carbonyl.

Suitable oxocarboxylates include keto acids, keto esters, keto anhydrides, aldo acids, aldo esters, and aldo anhydrides.

Suitable keto acids include, for example, pyruvic acid, acetoacetic acid, levulinic acid, oxaloacetic acid, 2-ketobutyric acid, 2-ketovaleric acid, homolevulinic acid, 4-acetylbutyric acid, 3-ketohexanoic acid, 5-acetylvaleric acid, and the like.

Suitable keto esters are lower (e.g., $C_1$-$C_{10}$, preferably $C_1$-$C_6$) alkyl or alkenyl esters of the keto acids. Suitable alcohols used for making the esters from the keto acids include, for example, methanol, ethanol, 1-propanol, 2-propanol, 1-butanol, 2-butanol, 1-hexanol, and the like, with methyl esters and ethyl esters being most preferred. Thus, suitable keto esters include, for example, ethyl pyruvate, ethyl acetoacetate, methyl acetoacetate, ethyl levulinate, ethyl 4-acetylbutyrate, and the like.

Suitable aldo acids include, for example, 2-oxoacetic acid, 3-oxopropanoic acid, 2-methyl-3-oxopropanoic acid, 4-oxobutanoic acid, 2-methyl-4-oxobutanoic acid, 3-methyl-4-oxobutanoic acid, 5-oxopentanoic acid, 2-methyl-5-oxopentanoic acid, 3-methyl-5-oxopentanoic acid, 4-methyl-5-oxopentanoic acid, 6-oxohexanoic acid, 5-methyl-6-oxohexanoic acid, and the like.

Suitable aldo esters are lower (e.g., $C_1$-$C_{10}$, preferably $C_1$-$C_6$) alkyl or alkenyl esters of the aldo acids. Suitable alcohols used for making the esters from the aldo acids include, for example, methanol, ethanol, 1-propanol, 2-propanol, 1-butanol, 2-butanol, 1-hexanol, and the like, with methyl esters and ethyl esters being most preferred. Thus, suitable aldo esters include, for example, ethyl 3-oxopropanoate, methyl 4-oxobutanoate, ethyl 6-oxohexanoate, and the like.

For additional examples of suitable oxocarboxylates, see U.S. Pat. Nos. 8,604,077; 8,546,519; and 8,053,468, the teachings of which are incorporated herein by reference.

The hydroxy-functional ketal acids, esters, and amides can be made by reacting oxocarboxylates with a triol. Suitable triols have are relatively low molecular weight compounds having three hydroxyl groups. Examples include glycerol, trimethylolpropane, trimethylolethane, 1,2,4-butanetriol, 1,2,5-trihydroxypentane, and the like. Glycerol, trimethylolpropane, and trimethylolethane are readily available and are preferred for some aspects. For additional examples of suitable triols, see U.S. Pat. Nos. 8,604,077; 8,546,519; and 8,053,468, the teachings of which are incorporated herein by reference.

The reaction of an oxycarboxylate and a triol, in some aspects in the presence of an acid catalyst, provides a hydroxy-functional ketal acid, ester, or amide. Suitable acid catalysts for this reaction are well known and include mineral acids, organic acids, solid acids, organic clays, and the like. Organic sulfonic acids, such as p-toluenesulfonic acid, are particularly preferred.

In some aspects, the hydroxy-functional ketal acid, ester, or amide has the general structure:

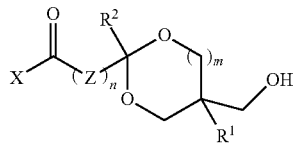

wherein $R^1$ is hydrogen, methyl, ethyl, or hydroxymethyl; $R^2$ is hydrogen, $C_1$-$C_{24}$ alkyl, or $C_1$-$C_{24}$ alkenyl; Z is a $C_1$-$C_6$ alkylene group or a $C_1$-$C_6$ alkylene group substituted with a $C_1$-$C_{24}$ alkyl or alkenyl group; X is $OR^3$; $R^3$ is hydrogen or a $C_1$-$C_{12}$ alkyl group or carboxylate; m is 0 or 1; and n is 0 or 1. In some aspects, X is preferably $OR^3$, and $R^3$ is a $C_1$-$C_{12}$ alkyl group.

Hydroxy-functional ketal esters are preferred. Suitable hydroxy-functional ketal esters include, for example, ethyl levulinate glycerol ketal, methyl levulinate trimethylolpropane ketal, ethyl levulinate trimethylolpropane ketal, ethyl pyruvate glycerol ketal, ethyl pyruvate triethylolpropane ketal, ethyl acetoacetate glycerol ketal, and the like. In some aspects, levulinate glycerol ketals are preferred hydroxy-functional ketal esters.

Aromatic Triacids and Tetraacids

The polymeric plasticizer compositions and processes of the present invention can further comprise triacids and tetraacids. Examples of these acids include the benzene tricarboxylic acids, such as benzene-1,2,3-tricarboxylic acid (which is also known as hemimellitic acid), benzene-1,2,4-tricarboxylic acid (which is also known as trimellitic acid), and benzene-1,2,5-tricarboxylic acid (which is also known as trimesic acid), and also the tetracarboxylic acid benzene-1,2,4,5-tetracarboxylic acid. Other examples include the naphthalene tricarboxylic acids and tetracarboxylic acids. Also, useful herein are esters and anhydrides of the tricarboxylic and tetracarboxylic acids, as well as mixtures of the compounds.

In some alternative embodiments, when the compositions and processes comprise an aromatic triacid or tetraacid, or ester, or anhydride thereof, then at least one or more of the following (a), (b), or (c) apply to the polymeric plasticizer composition: (a) the polymeric plasticizer composition has an acid value of less than 5 mg KOH/g, (b) the $C_4$-$C_{36}$ alcohol is not a $C_8$-$C_{12}$ alcohol, or (c) the $C_4$-$C_{36}$ monocarboxylic acid, or ester or anhydride thereof is not a $C_{12}$-$C_{18}$ monocarboxylic acid.

Hydrophobes

The polymeric plasticizer compositions and processes of the present invention can further comprise a hydrophobe. Hydrophobes include triglycerides and modified triglycerides, fatty acids, fatty acid esters, fatty diacids, vegetable oils and modified vegetable oils (for example as described in U.S. Pat. Nos. 5,922,779, 6,359,022, 6,664,363, and WO 2013/154874A1); castor oil (for example, as described in WO 2013/154874A1); modified or derivatized polyterpenes; modified cashew nut shell oil; cardanol; derivatives of cardanol; Diels Alder or ene reaction modified polyols (for example, as described in WO 2013/109834); and tall oil fatty acids (for example, as described in U.S. Pat. Nos. 5,075,417 and 4,897,429).

Examples of triglycerides suitable for the practice of this invention include soybean oil, algae oil, yeast oil, bacterial oil, animal tallow, fish oil, canola oil, castor oil, tung oil, linseed oil, corn oil, recycled cooking oil, sunflower oil, palm oil, peanut oil, palm kernel oil, cottonseed oil, coconut oil, and safflower oil.

Examples of fatty acids suitable for the practice of this invention include linoleic, myristic, palmitic, caproic, caprylic, capric, 2-ethyl hexanoic, lauric, stearic, oleic, linolenic, ricinoleic, tall oil, and mixtures thereof. The alkyl esters of these fatty acids and mixtures of these alkyl esters thereof are also suitable examples for the practice of this invention.

Examples of hydrophobes include those selected from ricinoleic acid, castor oil, ethoxylated castor oil, vegetable oils, fatty acids, fatty acid esters, modified vegetable oils, fatty triglycerides, cardanol-derived products, recycled cooking oil, hydroxy-functional materials derived from epoxidized, ozonized, or hydroformylated fatty esters or fatty acids, alkoxylated alkyl phenols, alkoxylated fatty alcohols, and combinations thereof.

Thermoplastic Polycarbonates

The polymeric plasticizer compositions and processes of the present invention can further comprise a thermoplastic polycarbonate (PC). Polycarbonates are polymers containing repeating units connected by carbonate functional groups. Many polycarbonates of commercial interest are derived from rigid monomers. A balance of useful features including temperature resistance, impact resistance and optical properties position polycarbonates between commodity plastics and engineering plastics. Polycarbonates can be produced by the reaction of bisphenol A (BPA) and phosgene. Examples of polycarbonates useful here include Lexan®, Calibre®, and Makrolon®. Polycarbonate is coded 7 implying that it is difficult to recycle, however, polycarbonate bottles and CDs are being extensively recycled. One method of recycling polycarbonate is by chemical recycling. Polycarbonate is made to react with phenol in the presence of a catalyst to form BPA and diphenyl carbonate (DPC) monomers. After purification, both these monomers are used to produce the polymer. Also useful herein is a thermoplastic polycarbonate blend with a thermoplastic polyester, a thermoplastic polycarbonate transreaction product with a thermoplastic polyester, and combinations thereof. Yet, other useful materials include poly(bisphenol-A carbonate), a blend or transreaction product of poly(bisphenol-A carbonate) and polyethylene terephthalate, a blend or transreaction product of poly(bisphenol-A carbonate) and polybutylene terephthalate, and combinations thereof.

Other Plasticizers

The polymeric plasticizer compositions and processes of the present invention can further comprise other plasticizers. Generally, these other plasticizers are monomeric or low molecular weight plasticizers that are well known. However, higher molecular weight and other polymeric plasticizers can be used. Examples of these other plasticizers include plasticizers selected from dioctyl phthalate (DOP) [which is also known as di(2-ethylhexyl) phthalate (DEHP) or bis-ethylhexyl phthalate, or diisooctyl phthalate (DIOP)], diisononyl phthalate (DINP), di-n-butylphthalate (DnBP, DBP), butyl benzyl phthalate (BBzP), diisodecyl phthalate (DIDP), dioctyl (straight chain octyl) phthalate, diethyl phthalate (DEP), diisobutyl phthalate (DIBP), di-n-hexyl phthalate, trimethyl trimellitate (TMTM), tri-(2-ethylhexyl) trimellitate (TEHTM-MG), tri-(n-octyl,n-decyl) trimellitate (ATM), tri-(heptyl,nonyl) trimellitate (LTM), n-octyl trimellitate (OTM), bis(2-ethylhexyl)adipate (DEHA), dimethyl adipate (DMAD), monomethyl adipate (MMAD), dioctyl adipate (DOA), dibutyl sebacate (DBS), dibutyl maleate (DBM), diisobutyl maleate (DIEM), benzoates, dioctyl terephthalate/DEHT, 1,2-cyclohexane dicarboxylic acid, diisononyl ester (BASF trademark: DINCH), epoxidized vegetable oils, alkyl sulphonic acid phenyl ester (ASE), sulfonamides, N-ethyl toluene sulfonamide (o/p ETSA), ortho and para isomers, N-(2-hydroxypropyl) benzene sulfonamide (HP BSA), N-(n-butyl) benzene sulfonamide (BBSA-NBBS), organophosphates, tricresyl phosphate (TCP), tributyl phosphate (TBP), glycols/polyethers, triethylene glycol dihexanoate (3G6, 3GH), tetraethylene glycol diheptanoate (4G7), polybutene, acetylated monoglycerides, alkyl citrates, triethyl citrate (TEC), acetyl triethyl citrate (ATEC), tributyl citrate (TBC), acetyl tributyl citrate (ATBC), trioctyl citrate (TOC), acetyl trioctyl citrate (ATOC), trihexyl citrate (THC), acetyl trihexyl citrate (ATHC), butyryl trihexyl citrate (BTHC, trihexyl o-butyryl citrate), trimethyl citrate (TMC), and combinations thereof.

Properties of the Polymeric Plasticizer Compositions

The polymeric plasticizer compositions can have a wide range of physical and chemical properties. The following are examples of such useful properties.

The polymeric plasticizer compositions will generally have a number average molecular weight from 500 to 25,000 grams/mole. It is generally found that polymeric, as opposed to lower weight monomeric, plasticizer compositions are desirable for compatibility with the polymers to be plasticized and to provide the desirable plasticizing effects. Other molecular weight ranges for the polymeric plasticizer compositions include a number average molecular weight from 800 to 10,000 grams/mole, and a number average molecular weight from 1000 to 8000 grams/mole.

The polymeric plasticizer compositions will generally have a low acid value and a low hydroxyl value, as such low values are generally preferred for compatibility with the polymers to be plasticized, and also to avoid unwanted breakdown and failure of the polymer. The polymeric plasticizer compositions generally have an acid value less than 10 mg KOH/g. In further embodiments, the polymeric plasticizer compositions have an acid value less than 5 mg KOH/g. In yet further embodiments, the polymer plasticizer compositions have an acid value less than 2 mg KOH/g.

The polymeric plasticizer compositions generally have a hydroxyl number less than 80 mg KOH/g. In further embodiments, the polymeric plasticizer compositions have a hydroxyl number less than 50 mg KOH/g. In yet further embodiments, the polymeric plasticizer compositions have a hydroxyl number less than 30 mg KOH/g. In yet further embodiments, the polymeric plasticizer compositions have a hydroxyl number less than 25 mg KOH/g.

Polymer plasticizer compositions having a low polymer backbone ether value are desirable and generally have good compatibility with the polymer to be plasticized and desirable performance characteristics. The generally, the polymeric plasticizer compositions have a polymer backbone ether value less than about 5 percent by weight ether oxygen based on the weight of the polymeric plasticizer.

The following weight ratios of the polymeric plasticizer composition components are useful: A polymeric plasticizer composition wherein the weight ratio of aromatic acid source in the polymeric plasticizer composition is from 5 to 90 weight percent. A polymeric plasticizer composition wherein the weight ratio of glycol in the polymeric plasticizer composition is from 5 to 70 weight percent. A polymeric plasticizer composition wherein the weight ratio of the $C_4$-$C_{36}$ monocarboxylic acid, or ester or anhydride thereof is from 5 to 80 percent.

The polymeric plasticizer compositions can have a wide range of viscosity. For example, polymeric plasticizers having a viscosity at 25° C. of from about 100 to about 300,000 cP are useful herein. Viscosity can be determined by any industry-accepted method. It is convenient to use, for instance, a Brookfield viscometer (such as a Brookfield DV-III Ultra rheometer) fitted with an appropriate spindle, and to measure a sample at several different torque settings to ensure an adequate confidence level in the measurements. Viscosity measurements can also be made at other temperatures.

Recycle Content

Because of environmental and resource concerns it is also desirable to have polymeric plasticizer compositions made from recycled materials, particularly with respect to the aromatic acid source. An advantage of such polymeric plasticizer compositions made from recycled sources on bio- or petrochemical sources for raw material. The present invention provides a means for recycling both the aromatic acid source, and also the other components described herein to provide a polymeric plasticizer having a high recycle content.

The glycols used herein can also be obtained from recycle sources. Some glycols, such as propylene glycol or ethylene glycol, are available as recovered or recycled materials. For instance, propylene glycol is used in deicing fluids, and after use, it can be recovered, purified, and reused. Additionally, recycled ethylene glycol may be obtained from recovered engine antifreeze or engine coolant. Preferably, the digestible polymer is prepared or obtained from renewable resources or post-consumer or post-industrial recycled sources.

By "recycle content," we mean the combined amounts of recycled aromatic acid source from, e.g. a thermoplastic polyester and any recycled glycol or $C_4$-$C_{36}$ monocarboxylic acid, or ester or anhydride thereof or of the further $C_4$-$C_{36}$ alcohol. Recycle content can be calculated, for instance, by combining the masses of recycled thermoplastic polyester and any recycled glycol, etc., dividing this sum by the total mass of reactants (glycols, thermoplastic polyester, and digestible polymer), and then multiplying the result by 100. The recycle content can range from 1 to 90 weight percent. In general, it is desirable that the recycle content as defined herein is greater than 10 weight percent. In other embodiments, it is desirable that the recycle content as defined herein is greater than 30 weight percent. In yet further embodiments, it is desirable that the recycle content as defined herein is greater than 50 weight percent. In yet further embodiments, it is desirable that the recycle content as defined herein is greater than 75 weight percent.

Processes for Preparing Polymeric Plasticizer Compositions

The polymeric plasticizer compositions can be used to plasticize a variety of polymeric materials, particularly thermoplastic polymers. The thermoplastic polymer can be selected from polyvinyl chloride (PVC), polyethylene terephthalate (PET), NBR (nitrile butyl rubber), acrylonitrile-butadiene rubber, PVC-PVA (polyvinyl alcohol) copolymers, acrylates, natural & synthetic rubber, CAB (cellulose acetate butyrate), CN (cellulose nitrate), EC (ethyl cellulose), PVB (polyvinyl butyral), chlorinated rubber, polyisoprene, styrene butadiene copolymers, butadiene, halobutyl rubber and combinations thereof. A particularly important polymer of commercial interest that can be plasticized with the polymeric plasticizer compositions herein is PVC. PVC is used in a wide variety of industrial and consumer applications.

The polymeric plasticizer composition can be made in either a stepwise process or in a single step process, depending on the aromatic acid source. In the instance when a thermoplastic polyester is used as an aromatic acid source, it is desirable to use a two-step process in which the first step is the glycolysis of the thermoplastic polyester followed by a second step involving further esterification or transesterification reactions. In most other cases, a one step process is suitable.

When used as a starting source, the thermoplastic polyester and glycol are heated, optionally in the presence of a catalyst, to give a digested intermediate. The digested intermediate will commonly be a mixture of glycol reactant, glycol(s) generated from the thermoplastic polyester, terephthalate oligomers, and other glycolysis products. For example, when PET or rPET is the thermoplastic polyester, the digested intermediate will include a mixture of glycol reactant, ethylene glycol (generated from the PET or rPET), bis(2-hydroxyalkyl) terephthalate ("BHAT"), higher PET oligomers, and other glycolysis products. Similar digested mixtures in various forms have been made and characterized previously (see, e.g., D. Paszun et al., *Ind. Eng. Chem. Res.* 36 (1997) 1373 and N. Ikladious, *J. Elast. Plast.* 32 (2000) 140), which are incorporated by reference herein in their entirety. Heating is advantageously performed at temperatures within the range of 80° C. to 260° C. Other temperature ranges include, 130° C. to 250° C., 150° C. to 250° C., 160° C. to 250° C., and 160° C. to 220° C.

More specifically, in the context of the present invention, glycolysis refers to the reaction of the hydroxyl group of a digested aromatic polyacid source, e.g., a thermoplastic polyester to reduce the molecular weight of the thermoplastic polyester thereby providing a polyol that is a liquid at temperatures between 20° C. and 120° C.

In one aspect, when the thermoplastic polyester is polyethylene terephthalate, the glycolysis intermediate comprises a glycol or mixture of glycols and a terephthalate component. The thermoplastic polyester components can be digested by glycols via a transesterification reaction and this digestion reaction is performed by heating the thermoplastic polyester, glycol(s), and any catalyst at least until the mixture liquefies and particles of the thermoplastic polyester are no longer apparent at the temperature of the reaction. The glycolysis reaction times range from about 30 minutes to about 16 hours, more typically 1 to 10 hours, even more typically 3 to 8 hours, and will depend on the reaction temperature, source of the thermoplastic polyester, the particular glycol reactant used, mixing rate, desired degree of depolymerization, and other factors that are within the skilled person's discretion.

The glycolysis products usually further react with carboxylic acids, esters, and anhydrides to complete the plasticizer composition synthesis. An appropriate distillation apparatus is utilized to eliminate condensation reaction by-products, such as water, ethanol, etc., and to minimize undesired glycol loss, which could lead to less reaction control.

Catalysts

Catalysts suitable for making the polymeric plasticizers are well known. See, e.g., K. Troev et al., J. Appl. Polym. Sci. 90 (2003) 1148, which is incorporated by reference herein in its entirety. In particular, suitable catalysts comprise titanium, zinc, antimony, germanium, zirconium, tin, manganese, or other metals. Specific examples include titanium alkoxides (e.g., tetrabutyl titanate), titanium(IV) phosphate, zirconium alkoxides, zinc acetate, lead acetate, cobalt acetate, manganese(II) acetate, antimony trioxide, germanium oxide, or the like, and mixtures thereof. In some embodiments, the catalyst is selected from titanium catalysts, tin catalysts, and combinations thereof. Examples of catalysts include butyltin tris-2-ethylhexanoate, butylstannoic acid, dibutyltin oxide, tetra-n-butyl titanate, triethanolamine titanium, titanium tetra-isopropoxide, and combinations thereof. The amount of catalyst used is typically in the range of 0.005 to 5 wt. %, preferably 0.01 to 1 wt. %, more preferably 0.05% to 0.1 wt. %, based on the total amount of polymeric plasticizer composition being prepared. Because of the relatively small amount of the catalyst used, it is often more convenient to determine the amount of catalyst in parts per million (ppm) based on the total composition of the polymeric plasticizer composition. The weight percentage ranges of 0.005 to 5 wt. %, 0.01 to 1 wt. %, and 0.05% to 0.1 wt. %, correspond to the following ranges in ppm respectively: 5 to 50,000 ppm, 50 to 10,000 ppm, and 500 to 1000 ppm.

Plasticized Polymer Compositions

Plasticized polymer compositions are prepared by combining the polymeric plasticizer composition and the polymer to be plasticized, such as for example PVC, using methods well known in the art. Other additives can be used such as fillers, lubricants, antidegradants, and heat stabilizers, depending on the application and performance requirements. See, Ed. Richard F. Grossman, "*Handbook of Vinyl Formulating*, $2^{nd}$ edition, (Wiley) April 2008, which is incorporated by reference herein in its entirety.

In general the plasticized compositions comprise from 10% to 90% by weight percent of the polymeric plasticizer composition and from 10% to 90% by weight percent of the polymer to be plasticized, such as a thermoplastic polymer. Other ranges for the plasticized compositions comprise from 15% to 85% by weight percent of the polymeric plasticizer composition and from 15% to 85% by weight percent of the polymer to be plasticized. Yet other ranges for the plasticized compositions comprise from 10% to 80% by weight percent of the polymeric plasticizer composition and from 20% to 90% by weight percent of the polymer to be plasticized.

Testing and Evaluation Methods

Properties of the polymeric plasticizer compositions and plasticized polymers prepared therefrom are evaluated using various tests and methods well known in the art. The evaluation of the compositions is further described in the examples.

EXAMPLES

The following examples further describe and demonstrate embodiments within the scope of the present invention. The Examples are given solely for purpose of illustration and are not to be construed as limitations of the present invention, as many variations thereof are possible without departing from the spirit and scope of the invention.

Acid values and hydroxyl numbers are determined by standard methods as provided by ASTM D3339 and ASTM E-222, respectively. Acid values are reported as mg KOH per g of plasticizer and hydroxyl numbers are reported as mg KOH per g of plasticizer.

Viscosities are measured at 25° C. using a Brookfield DV-Ill Ultra rheometer with spindle #31 at 25%, 50%, and 75% torque, with 50% torque being the usual torque setting. Alternatively, depending on the viscosity of the sample, viscosities can also be measured at other temperatures, including up to about 50° C. or higher.

Stress-Strain is evaluated using ASTM D412 and reported as tensile strength modulus (PSI) at 100% elongation, and percent elongation.

Hardness is evaluated using ASTM D2240 and reported as Shore A Hardness for 15 seconds at 21° C.

Volume and surface resistivity can be determined using ASTM D257. Volume resistivity is defined as the electrical resistance through a cube of insulating material. When expressed as ohm·cm (Ω·cm) this is the electrical resistance through a one-inch cube of insulating material. Surface resistivity is defined as the electrical resistance of the surface of an insulator material. It is measured from electrode to electrode along the surface of the insulator sample and reported as kohm/sq (kΩ/sq).

Number average molecular weights are also reported, as calculated by Miller-Macosko Theory. See, Christopher W. Macosko, Douglas R. Miller, "A new derivation of average molecular weights of nonlinear polymers" Macromolecules, 1976, 9(2), PP 199-206, which is incorporated by reference herein in its entirety.

Table 1 summarizes various properties for the polymeric plasticizer compositions of the present invention. The reported viscosity data in Table 1 was measured at 25° C. using a Brookfield DV-III Ultra rheometer with spindle #31 at 50% torque.

Table 2 and Table 3 summarize data for properties of plasticized polyvinyl chloride (PVC) polymer compositions prepared, as described in Example 2, with the indicated polymeric plasticizer compositions of the present invention, as described in Example 1.

Example 1

General Procedure for Preparation of Polymeric Plasticizer Compositions

The polymeric plasticizer compositions are made using the following general procedures.

Procedure when the Aromatic Acid Source is an Aromatic Diacid or Ester or Anhydride The aromatic acid source, the glycol, and the $C_4$-$C_{36}$ monocarboxylic acid, or ester or anhydride thereof are charged into a 4 neck round bottom flask reactor and then the reactor is placed in a heating mantle that is connected to a temperature controller. A nitrogen gas inlet, a thermocouple, and a mechanical stirrer are connected to the reactor. The reaction is performed at 189-250° C. under nitrogen sparging conditions. When proper acidity is achieved by sampling and measuring the acid value, the reaction is terminated and characterized.

Procedure: Aromatic Polyester or Polycarbonate as an Aromatic Acid Source

A solid polymeric thermoplastic polyester such as PET is used as the acid source, for example PET or recycled PET (rPET) pellets or flakes. The polymeric thermoplastic polyester, the glycol, or $C_4$-$C_{36}$ alcohols, and the combination of thereof, and catalyst are charged into the same reaction set up. Glycolysis is performed at 180-250° C. under nitrogen sparging. When the solid polymeric material is completely digested, the reaction mixture is cooled to 100-130° C. and the $C_4$-$C_{36}$ monocarboxylic acid, or ester or anhydride, or diacid, or hydroxyacid, and combination thereof are added. Any other components are also added at this point. The temperature controller is set at 180-250° C., and the esterification reaction is performed under nitrogen sparging condition. Any esterification by-product, for example water, and/or transesterification by-product, for example methanol or other alcohols, is eliminated from the reaction system. The reaction is allowed to proceed until the desired acid number is achieved.

If additional or other optional components are included, these are generally added at this time.

The resulting polymeric plasticizer composition is useful for plasticizing various thermoplastic polymers.

Polymer Plasticizer Compositions 1-23 of the present invention were prepared using the general experimental procedure described in this Example 1. The reactant components used to prepare the polymeric plasticizer compositions are reported on a weight percentage basis. rPET indicates recycled PET and rPG indicates recycled propylene glycol. For all of the following Polymeric Plasticizer Compositions the following catalyst was used: 500 to 1000 ppm titanium (IV) butoxide.

Polymeric Plasticizer Composition 1. 15.25% rPET, 14.95% 1,4-butanediol, 14.95% 1,3-butanediol, 13.68% decanoic acid, 5.26% 12-hydroxystearic acid, 17.96% succinic acid, and 17.96% adipic.

Polymeric Plasticizer Composition 2. 15.25% rPET, 15.06% 1,4-butanediol, 15.06% 1,3-butanediol, 7.22% decanoic acid, 4.00% dodecanoic acid, 5.28% 12-hydroxystearic acid, 18.94% succinic acid, and 18.94% adipic acid.

Polymeric Plasticizer Composition 3. 15.28% rPET, 15.28% rPG, 6.42% 1,4-butane diol, 6.42% 1,3-butane diol, 13.95% decanoic acid, 5.35% 12-hydroxystearic acid, 18.65% succinic acid, and 18.65% adipic acid.

Polymeric Plasticizer Composition 4. 15.06% rPET, 16.68% rPG, 47.69% 2-ethylhexanoic acid, and 20.57% dimer fatty acid.

Polymeric Plasticizer Composition 5. 12.81% rPET, 14.20%, rPG, 55.49% 2-butyloctanoic acid, and 17.80% dimer fatty acid.

Polymeric Plasticizer Composition 6. 15.07% rPET, 14.61% 1,4-butanediol, 14.61% 1,3-butane diol, 15.64% decanoic acid, 5.14% hydroxystearic acid, 17.47% succinic acid, and 17.47% adipic acid.

Polymeric Plasticizer Composition 7. 15.49% rPET, 15.03% 1,4-butanediol, 15.03% 1,3-butane diol, 11.40% decanoic acid, 5.27% 12-hydroxystearic acid, 18.90% succinic acid, and 18.90% adipic acid.

Polymeric Plasticizer Composition 8. 15.27% rPET, 15.28% rPG, 6.11% 1,4-butane diol, 6.11% 1,3-butane diol, 15.64% decanoic acid, 5.09% 12-hydroxystearic acid, 18.25% succinic acid, and 18.25% adipic acid.

Polymeric Plasticizer Composition 9. 20.00% rPET, 15.00% rPG, 5.20% 1,4-butane diol, 5.20% 1,3-butane diol, 16.06% decanoic acid, 5.35% 12-hydroxystearic acid, 16.60% succinic acid, and 16.60% adipic acid.

Polymeric Plasticizer Composition 10. 16.65% rPET, 18.47% rPG, 16.73% decanoic acid, 33.60% dimer fatty acid, and 14.55% succinic acid.

Polymeric Plasticizer Composition 11. 20.39% rPET, 4.37% rPG, 8.12% glycerol, 5.18% 1,3-butane diol, 41.48% decanoic acid, 5.28% ricinoleic acid, 6.78% succinic acid, and 8.40% adipic acid.

Polymeric Plasticizer Composition 12. 18.41% rPET, 18.41% rPG, 26.13% decanoic acid, 4.60% dimer fatty acid, and 25.90% succinic acid.

Polymeric Plasticizer Composition 13. 29.02% rPET, 10.41% rPG, 5.30% glycerol, 4.06% 1,3-butane diol, 29.74% dodecanoic acid, and 21.47% succinic acid.

Polymeric Plasticizer Composition 14. 18.84% rPET, 7.28% rPG, 8.06% glycerol, 2.87% 1,3-butane diol, 47.88% dodecanoic acid, and 15.07% succinic acid.

Polymeric Plasticizer Composition 15. 13.54% rPET, 15.04% rPG, 52.92% neodecanoic acid, and 18.51% dimer fatty acid.

Polymeric Plasticizer Composition 16. 16.37% rPET, 18.17% rPG, 43.08% levulinic acid, and 22.38% dimer fatty acid.

Polymeric Plasticizer Composition 17. 8.45% rPET, 10.45% rPG, 78.59% decyltetradecanoic acid, and 12.84% dimer fatty acid.

Polymeric Plasticizer Composition 18. 23.00% rPET, 20.50% rPG, 22.5% succinic acid, 24.00% decanoic acid, and 10.00% ethyl levulinate glycerol ketal.

Polymeric Plasticizer Composition 19. 23.00% rPET, 21.50% rPG, 24.50% succinic acid, 24.00% decanoic acid, and 7.00% polycarbonate polyol (Mn=1000 g/mol).

Polymeric Plasticizer Composition 20. 23.00% rPET, 21.50% rPG, 24.50% succinic acid, 24.00% decanoic acid, and 7.00% poly(bisphenol-A carbonate).

Polymeric Plasticizer Composition 21. 16.20% rPET, 16.20% rPG, 14.58% succinic acid, and 52.02% methyl oleate.

Polymeric Plasticizer Composition 22. 18.51% rPET, 9.51% rPG, 4.34% neopentyl glycol, 7.92% glycerin, 19.69% succinic acid, and 40.03% decanoic acid.

Polymeric Plasticizer Composition 23. 20.49% rPET, 20.49% rPG, 5.69% neopentyl glycol, 28.07% succinic acid, and 25.26% decanoic acid.

Example 2

Plasticized Polyvinyl Chloride Polymer Compositions

Using standard manufacturing techniques, plasticized polymeric compositions are made using the polymeric plasticizer compositions of the present invention and the desired polymer, for example a thermoplastic polymer.

The plasticized polymers can be used for example as a replacement for rubber, and have applications in areas including electrical cable insulation, flooring, coatings, tubing, inflatable products, and imitation leather.

The following formulation is an example of a plasticized polymer composition useful for wire and cable coatings.

Plasticized Polymer Formulation for Wire and Cable Applications
Polyvinylchloride (PVC) resin: 100 PHR
Polymeric Plasticizer of the Present Invention: 35 PHR
Additional Low Molecular Weight Plasticizers: 30 PHR
Ca/Zn: 4.5 PHR
Stearic acid: 0.2 PHR
Calcined Clay: 12 PHR
Antimony Oxide: 3 PHR In the above formulation, PHR refers to parts per hundred parts of resin, which is a standard means in the art for referring to polymer formulations. In this example a PVC resin is used corresponding to 100 parts. The remaining components are with reference to the 100 parts total of the PVC resin. Three different plasticized polymer compositions were prepared using 35 PHR of the indicated polymeric plasticizer compositions. The resulting plasticized PVC is useful for wire and cable applications.

Composition A. Plasticized Polyvinylchloride (PVC)—Control Composition

This composition was prepared according to the above formula of Example 2 using 35 PHR of a commercially available polymeric plasticizer (control composition).

Composition B. Plasticized Polyvinylchloride (PVC)

This composition was prepared according to the above formula of Example 2 using 35 PHR of Polymeric Plasticizer Composition 1 described in Example 1.

Composition C. Plasticized Polyvinylchloride (PVC)

This composition was prepared according to the above formula of Example 2 using 35 PHR of Polymeric Plasticizer Composition 2 described in Example 1.

Composition D. Plasticized Polyvinylchloride (PVC)

This composition was prepared according to the above formula of Example 2 using 35 PHR of Polymeric Plasticizer Composition 22 described in Example 1.

Composition E. Plasticized Polyvinylchloride (PVC)

This composition was prepared according to the above formula of Example 2 using 35 PHR of Polymeric Plasticizer Composition 23 described in Example 1.

The following properties were determined on the plasticized polymeric plasticizer compositions: Stress-Strain was evaluated using ASTM D412 and reported as tensile strength (PSI) and modulus at 100% elongation. Furthermore, the stress strain, reported as tensile strength and modulus at 100% elongation was measured on samples aged at 136° C. for 7 days and on samples aged in oil at 60° C. for 7 days (UL 1581). The oil used was petroleum oil, CAS 64742-52-5, available from Sunoco under the trade name IRM 902. Hardness was evaluated using ASTM D2240 and reported as Shore A Hardness for 15 seconds at 21° C. and percent elongation at break. Volume and surface resistivity were determined using ASTM D257. Volume resistivity is defined as the electrical resistance through a cube of insulating material. When expressed as ohm·cm (Ω·cm), this is the electrical resistance through a one-inch cube of insulating material. Surface resistivity is defined as the electrical resistance of the surface of an insulator material. It is measured from electrode to electrode along the surface of the insulator sample and reported as kohm/sq (kΩ/sq).

Also, brittleness and limiting oxygen index were determined. Brittleness is measured by ASTM D746 and reported as ° C. The limiting oxygen index (LOI) is the minimum concentration of oxygen, expressed as a percentage, that will support combustion of a polymer. It is measured by passing a mixture of oxygen and nitrogen over a burning specimen, and reducing the oxygen level until a critical level is reached. LOI values for different plastics are determined by standardized tests, such as the ISO 4589 and ASTM D2863.

Table 2 and Table 3 summarize these properties of the plasticized thermoplastic polymer Compositions A, B, C, D, and E.

Example 3

Plasticized Polyethylene Terephthalate (PET) Composition

PET pellets and Polymeric Plasticizer Composition 6 described in Example 1, 100 grams of each, were charged into a 500 mL 4-neck round bottom flask. The mixture was placed under a nitrogen atmosphere and stirred slowly with heating, at a temperature of 220° C., until the pellets completely dissolved. The temperature of the reaction mixture was cooled to 200° C. and poured into Teflon dishes to form an opaque, tan material.

TABLE 1

Polymeric Plasticizer Composition Properties

| Polymeric Plasticizer Composition No. | Acid Value (mg KOH/g) | Hydroxyl Number (mg KOH/g) | Viscosity (cP) | Number Average Molecular Weight (grams/mole) |
|---|---|---|---|---|
| 1 | 0.4 | 25.1 | 7648 | 1500 |
| 2 | 0.5 | 21.5 | 16,203 | 2000 |
| 3 | 2.0 | 31.9 | 19,316 | 1500 |
| 4 | 1.8 | 19.6 | 221 | 500 |
| 5 | 2.5 | 17.1 | 282 | 600 |
| 6 | 1.6 | 12.5 | 5849 | 1500 |
| 7 | 0.7 | 19.2 | 11,698 | 2000 |
| 8 | 2.3 | 5.0 | 10,626 | 1500 |
| 9 | 1.7 | 16.4 | 15,731 | 1500 |
| 10 | 0.6 | 14.7 | 17,403 | 1500 |
| 11 | 1.7 | 5.0 | 1810 | 1000 |
| 12 | 0.5 | 26.5 | 4174 | 1000 |
| 13 | 1.2 | 13.1 | 73,784 | 1500 |
| 14 | 3.9 | 11.4 | 2852 | 1000 |
| 15 | 1.3 | 15.0 | 811 | 600 |
| 16 | 1.2 | 38.9 | 6494 | 500 |
| 17 | 1.6 | 7.0 | 348 | 900 |
| 18 | 0.5 | 51.2 | 8892 | 650 |
| 19 | 0.9 | 36.2 | 5099 | 940 |
| 20 | 1.9 | 30.9 | 33,126 | 1000 |
| 21 | 1.1 | 3.6 | 420 | 1000 |
| 22 | 2.0 | 10.0 | 4800 | 1000 |
| 23 | 1.7 | 5.8 | 12,000 | 1000 |

TABLE 2

Plasticized Polymer Composition Properties

| Plasticized Polymer Composition No. | Tensile Strength (PSI) | Modulus at 100% Elongation | Hardness Shore A | Percent Elongation at Break | Volume Resistivity ($\Omega \cdot cm$) | Surface Resistivity (k$\Omega$/sq.) |
|---|---|---|---|---|---|---|
| A | 2912 | 1253 | 77.3 | 420 | $2.80 \times 10^{14}$ | $1.60 \times 10^{15}$ |
| B | 3121 | 1532 | 81.0 | 422 | $4.64 \times 10^{14}$ | $1.45 \times 10^{15}$ |
| C | 3095 | 1600 | 82.0 | 417 | $5.29 \times 10^{14}$ | $2.68 \times 10^{15}$ |
| D | 2915 | 1671 | 86.0 | 365 | $1.4 \times 10^{15}$ | $2.7 \times 10^{15}$ |
| E | 3130 | 1791 | 85.5 | 375 | $1.8 \times 10^{15}$ | $2.2 \times 10^{15}$ |

TABLE 3

Plasticized Polymer Composition Properties

| Plasticized Polymer Composition No. | Aging at 136° C. for 7 days | | Aging at 60° C. Oil for 7 days | | Brittleness ° C. | Limiting Oxygen Index (LOI) |
|---|---|---|---|---|---|---|
| | Tensile Strength (PSI) | % Elongation at Break | Tensile Strength (PSI) | % Elongation at Break | | |
| A | 2870 | 404 | 2905 | 361 | −22.0 | 26.9 |
| B | 2923 | 369 | 2861 | 335 | −18.0 | 27.3 |
| C | 2724 | 390 | 2766 | 334 | −15.0 | 27.3 |
| D | 2887 | 345 | 2858 | 327 | −16.0 | 28.3 |
| E | 2923 | 304 | 2970 | 328 | −12.5 | 27.5 |

INCORPORATION BY REFERENCE

The entire disclosure of each of the patent documents, including certificates of correction, patent application documents, scientific articles, governmental reports, websites, and other references referred to herein is incorporated by reference herein in its entirety for all purposes. In case of a conflict in terminology, the present specification controls.

EQUIVALENTS

The invention can be embodied in other specific forms without departing from the spirit or essential characteristics thereof. The foregoing embodiments are to be considered in all respects illustrative rather than limiting on the invention described herein. In the various embodiments of the methods and systems of the present invention, where the term comprises is used with respect to the recited steps or components, it is also contemplated that the methods and systems consist essentially of, or consist of, the recited steps or components. Further, it should be understood that the order of steps or order for performing certain actions is immaterial so long as the invention remains operable. Moreover, two or more steps or actions can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control.

In some instances the required and addition components describe herein can be categorized differently or in more than one category.

All percentages and ratios used herein, unless otherwise indicated, are by weight. Also, throughout the disclosure the term "weight" is used. It is recognized the mass of an object is often referred to as its weight in everyday usage and for most common scientific purposes, but that mass technically refers to the amount of matter of an object, whereas weight refers to the force experienced by an object due to gravity. Also, in common usage the "weight" (mass) of an object is what one determines when one "weighs" (masses) an object on a scale or balance.

What is claimed is:

1. A process for preparing a polymeric plasticizer composition comprising reacting:
   (a) an aromatic acid source selected from an aromatic diacid, an aromatic diacid anhydride, an aromatic diacid monoester, an aromatic diacid diester, an aromatic linear ester oligomer, an aromatic linear thermoplastic polyester, and combinations thereof;
   (b) a glycol;
   (c) a $C_4$-$C_{36}$ monocarboxylic acid, or ester or anhydride thereof; and
   (d) an alkyl levulinate glycerol ketal at a temperature between 80° C. and 260° C.

2. A process for preparing a polymeric plasticizer composition according to claim 1 further comprising performing the reaction in the presence a catalyst.

3. A process for preparing a polymeric plasticizer composition according to claim 2 wherein the catalyst is selected from titanium catalysts, tin catalysts, and combinations thereof.

4. A process for preparing a polymeric plasticizer composition according to claim 3 wherein the catalyst is selected from butyltin tris-2-ethylhexanoate, butylstannoic acid, dibutyltin oxide, tetra-n-butyl titanate, triethanolamine titanium, titanium tetra-isopropoxide, and combinations thereof.

5. A process for preparing a polymeric plasticizer composition according to claim 1, wherein the aromatic acid source is selected from an aromatic diacid, an aromatic diacid anhydride, an aromatic diacid monoester, an aromatic diacid diester, and combinations thereof.

6. A process for preparing a polymeric plasticizer composition according to claim 1, wherein the aromatic linear thermoplastic polyester is selected from polyethylene terephthalate, polybutylene terephthalate, polytrimethylene terephthalate, polyethylene furanoate, glycol-modified polyethylene terephthalate, copolymers of terephthalic acid and 1,4-cyclohexanedimethanol, isophthalic acid-modified copolymers of terephthalic acid and 1,4-cyclohexanedimethanol, copolymers of 2,5-furandicarboxylic acid and a glycol, copolymers of dialkyl 2,5-furandicarboxylate and a glycol, dihydroferulic acid polymers, copolymers of 2,2,4,4-tetramethyl-1,3-cyclobutanediol with isophthalic acid, terephthalic acid or orthophthalic derivatives, and combinations thereof.

7. A process for preparing a polymeric plasticizer composition according to claim 1, wherein the aromatic linear thermoplastic polyester is selected from virgin polyethylene terephthalate, recycled polyethylene terephthalate, and combinations thereof.

8. A process for preparing a polymeric plasticizer composition according to claim 1, wherein the glycol is selected from ethylene glycol, propylene glycol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 2-methyl-1,3-propanediol, neopentyl glycol, glycerol, trimethylolpropane, 3-methyl-1,5-pentanediol, 1,4-cyclohexanedimethanol, 1,3-cyclohexanedimethanol, diethylene glycol, tetraethylene glycol, dipropylene glycol, triethylene glycol, tripropylene glycol, polyethylene glycol, polypropylene glycol, polycarbonate polyols, pentaerythritol, sorbitol, and block or random copolymer glycols of ethylene oxide and propylene oxide, aliphatic polyester polyols, 2,2,4,4-tetramethyl-1,3-cyclobutanediol, and combinations thereof.

9. A process for preparing a polymeric plasticizer composition according to claim 1, wherein the glycol is selected from ethylene glycol, propylene glycol, 1,3-propanediol, 1,2-butanediol, 1,3-butanediol, 1,4-butanediol, 1,4-hexanediol, 2-methyl-1,3-propanediol, neopentyl glycol, glycerol, trimethylolpropane, 3-methyl-1,5-pentanediol, 1,4-cyclohexanedimethanol, diethylene glycol, tetraethylene glycol, dipropylene glycol, triethylene glycol, tripropylene glycol, pentaerythritol, sorbitol, and combinations thereof.

10. A process for preparing a polymeric plasticizer composition according to claim 1, wherein the glycol is selected from 1,3-butanediol, 1,4-butanediol, propylene glycol, glycerol, neopentyl glycol, and combinations thereof.

11. A process for preparing a polymeric plasticizer composition according to claim 1, wherein the alkyl levulinate glycerol ketal is ethyl levulinate glycerol ketal.

12. A process for preparing a polymeric plasticizer composition according to claim 1, wherein the alkyl levulinate glycerol ketal has the general structure:

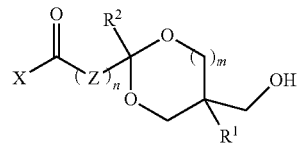

wherein $R^1$ is hydrogen, methyl, ethyl, or hydroxymethyl; $R^2$ is hydrogen, $C_1$-$C_{24}$ alkyl, or $C_1$-$C_{24}$ alkenyl; Z is a $C_1$-$C_6$ alkylene group or a $C_1$-$C_6$ alkylene group substituted with a $C_1$-$C_{24}$ alkyl or alkenyl group; X is $OR^3$; $R^3$ is hydrogen or a $C_1$-$C_{12}$ alkyl group or carboxylate; m is 0 or 1; and n is 0 or 1.

13. A process for preparing a polymeric plasticizer composition according to claim 12, wherein X is $OR^3$, and $R^3$ is a $C_1$-$C_{12}$ alkyl group.

14. A process for preparing a polymeric plasticizer composition according to claim 1, wherein the polymeric plasticizer composition has a recycle content as defined herein greater than 10 weight percent.

15. A process for preparing a polymeric plasticizer composition according to claim 1, wherein the polymeric plasticizer composition has a recycle content as defined herein greater than 50 weight percent.

16. A process for preparing a polymeric plasticizer composition according to claim 1, wherein the polymeric plasticizer composition has a recycle content as defined herein greater than 75 weight percent.

17. A process for preparing a polymeric plasticizer composition according to claim 1, wherein the polymeric plasticizer composition has a recycle content as defined herein greater than 30 weight percent.

18. A process for preparing a polymeric plasticizer composition comprising reacting:
   (a) an aromatic acid source selected from an aromatic linear ester oligomer, an aromatic linear thermoplastic polyester, and combinations thereof;
   (b) a glycol; and
   (c) a $C_4$-$C_{36}$ monocarboxylic acid, or ester or anhydride thereof at a temperature between 80° C. and 260° C.

19. A process for preparing a polymeric plasticizer composition according to claim 18, wherein the aromatic acid source is an aromatic linear ester oligomer.

20. A process for preparing a polymeric plasticizer composition according to claim 18, wherein the aromatic acid source is an aromatic linear thermoplastic polyester.

21. A process for preparing a polymeric plasticizer composition according to claim 20 further comprising performing the reaction in the presence a catalyst.

22. A process for preparing a polymeric plasticizer composition according to claim 21 wherein the catalyst is selected from titanium catalysts, tin catalysts, and combinations thereof.

23. A process for preparing a polymeric plasticizer composition according to claim 22 wherein the catalyst is selected from butyltin tris-2-ethylhexanoate, butylstannoic acid, dibutyltin oxide, tetra-n-butyl titanate, triethanolamine titanium, titanium tetra-isopropoxide, and combinations thereof.

24. A process for preparing a polymeric plasticizer composition according to claim 20, wherein the aromatic linear thermoplastic polyester is selected from polyethylene terephthalate, polybutylene terephthalate, polytrimethylene terephthalate, polyethylene furanoate, glycol-modified polyethylene terephthalate, copolymers of terephthalic acid and 1,4-cyclohexanedimethanol, isophthalic acid-modified copolymers of terephthalic acid and 1,4-cyclohexanedimethanol, copolymers of 2,5-furandicarboxylic acid and a glycol, copolymers of dialkyl 2,5-furandicarboxylate and a glycol, dihydroferulic acid polymers, copolymers of 2,2,4,4-tetramethyl-1,3-cyclobutanediol with isophthalic acid, terephthalic acid or orthophthalic derivatives, and combinations thereof.

25. A process for preparing a polymeric plasticizer composition according to claim 20, wherein the aromatic linear thermoplastic polyester is selected from virgin polyethylene terephthalate, recycled polyethylene terephthalate, and combinations thereof.

26. A process for preparing a polymeric plasticizer composition according to claim 20, wherein the glycol is selected from ethylene glycol, propylene glycol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 2-methyl-1,3-propanediol, neopentyl glycol, glycerol, trimethylolpropane, 3-methyl-1,5-pentanediol, 1,4-cyclohexanedimethanol, 1,3-cyclohexanedimethanol, diethylene glycol, tetraethylene glycol, dipropylene glycol, triethylene glycol, tripropylene glycol, polyethylene glycol, polypropylene glycol, polycarbonate polyols, pentaerythritol, sorbitol, and block or random copolymer glycols of ethylene oxide and propylene oxide, aliphatic polyester polyols, 2,2,4,4-tetramethyl-1,3-cyclobutanediol, and combinations thereof.

27. A process for preparing a polymeric plasticizer composition according to claim 20, wherein the glycol is selected from ethylene glycol, propylene glycol, 1,3-propanediol, 1,2-butanediol, 1,3-butanediol, 1,4-butanediol, 1,4-hexanediol, 2-methyl-1,3-propanediol, neopentyl glycol, glycerol, trimethylolpropane, 3-methyl-1,5-pentanediol, 1,4-cyclohexanedimethanol, diethylene glycol, tetraethylene glycol, dipropylene glycol, triethylene glycol, tripropylene glycol, pentaerythritol, sorbitol, and combinations thereof.

28. A process for preparing a polymeric plasticizer composition according to claim 20, wherein the glycol is selected from 1,3-butanediol, 1,4-butanediol, propylene glycol, glycerol, neopentyl glycol, and combinations thereof.

29. A process for preparing a polymeric plasticizer composition according to claim 20, wherein the polymeric plasticizer composition has a recycle content as defined herein greater than 10 weight percent.

30. A process for preparing a polymeric plasticizer composition according to claim 20, wherein the polymeric plasticizer composition has a recycle content as defined herein greater than 50 weight percent.

31. A process for preparing a polymeric plasticizer composition according to claim 20, wherein the polymeric plasticizer composition has a recycle content as defined herein greater than 75 weight percent.

* * * * *